United States Patent
Kawamoto et al.

(10) Patent No.: US 6,756,414 B2
(45) Date of Patent: *Jun. 29, 2004

(54) POLYMER POLYOL COMPOSITION, PROCESS FOR PRODUCING THE SAME, AND PROCESS FOR PRODUCING POLYURETHANE RESIN

(75) Inventors: Tetsuji Kawamoto, Takatsuki (JP); Tomio Kawazoe, Otsu (JP); Kiyoshi Ikeda, Shizuoka (JP); Munekazu Satake, Kyoto (JP); Futoshi Kitatani, Higashikatsushika-gun (JP); Tsuyoshi Tomosada, Otsu (JP); Takeshi Furuta, Otsu (JP); Takayuki Tsuji, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/463,644

(22) Filed: Jun. 17, 2003

(65) Prior Publication Data

US 2003/0216486 A1 Nov. 20, 2003

Related U.S. Application Data

(63) Continuation of application No. 10/068,182, filed on Feb. 6, 2002, now Pat. No. 6,624,209, which is a continuation-in-part of application No. 09/806,609, filed as application No. PCT/JP00/04999 on Jul. 26, 2000, now abandoned.

(30) Foreign Application Priority Data

| Jul. 30, 1999 | (JP) | ............................................ | 11-218171 |
| Aug. 6, 1999 | (JP) | ............................................ | 11-224119 |
| Nov. 30, 1999 | (JP) | ............................................ | 11-339234 |
| Jan. 24, 2000 | (JP) | ........................................ | 2000-015109 |
| Jun. 16, 2000 | (JP) | ........................................ | 2000-182351 |
| Feb. 7, 2001 | (JP) | ........................................ | 2001-031546 |
| Aug. 31, 2001 | (JP) | ........................................ | 2001-262887 |

(51) Int. Cl.⁷ ............................................. C08G 18/10
(52) U.S. Cl. ...................... 521/137; 521/155; 521/174; 252/182.24; 252/182.27; 524/762; 524/765; 524/773
(58) Field of Search ................................ 521/137, 155, 521/174; 252/182.24, 182.27; 524/762, 765, 773

(56) References Cited

U.S. PATENT DOCUMENTS

| 3,383,351 A | 5/1968 | Stenberger |
| 3,775,350 A | 11/1973 | Juhas |
| 3,823,201 A | 7/1974 | Pizzini et al. |
| 3,869,413 A | 3/1975 | Blankenship |
| 4,014,846 A | 3/1977 | Ramlow et al. |
| 4,032,485 A | 6/1977 | Onoda et al. |
| 4,093,573 A | 6/1978 | Ramlow et al. |
| 4,111,865 A | 9/1978 | Seefried, Jr. et al. |
| 4,148,840 A | 4/1979 | Shah |
| 4,198,488 A | 4/1980 | Drake et al. |
| 4,226,756 A | 10/1980 | Critchfield et al. |
| 4,299,924 A | 11/1981 | Nomura et al. |
| 4,312,963 A | 1/1982 | Chandalia et al. |
| 4,390,645 A | 6/1983 | Hoffman et al. |
| 4,431,754 A | 2/1984 | Hoffman |
| 4,454,255 A | 6/1984 | Ramlow et al. |
| 4,463,107 A | 7/1984 | Simroth et al. |
| 4,585,831 A | 4/1986 | Stamberger |
| 4,647,624 A | 3/1987 | Stamberger |
| 4,721,733 A | 1/1988 | Gastinger et al. |
| 4,745,153 A | 5/1988 | Hoffman |

(List continued on next page.)

FOREIGN PATENT DOCUMENTS

| EP | 285268 | 10/1988 |
| EP | 510533 | 10/1992 |
| EP | 731118 | 9/1996 |
| EP | 0 786 480 | 1/1997 |
| EP | 786480 | 7/1997 |
| JP | 60252612 | 12/1985 |
| JP | 61-115919 | 6/1986 |
| JP | 62-149748 | 7/1987 |
| JP | 1-161007 | 6/1989 |
| JP | 1-161008 | 6/1989 |
| JP | 9-77968 | 3/1992 |
| JP | 9-309937 | 12/1992 |
| JP | 5-59134 | 3/1993 |
| JP | 5-247109 | 9/1993 |
| JP | 06056943 | 3/1994 |
| JP | 7-196749 | 8/1995 |
| JP | 8-259641 | 10/1996 |
| JP | 8-333508 | 12/1996 |
| JP | 08301944 | 11/1998 |
| WO | 8504891 | 11/1995 |
| WO | 98 52988 | 11/1998 |

Primary Examiner—John M. Cooney, Jr.
(74) Attorney, Agent, or Firm—Merchant & Gould P.C.

(57) ABSTRACT

This invention provides a polymer polyol composition (I) comprising a polyol (A) and polymer particles (B) dispersed in (A), the polymer particles (B) being formed by polymerizing an ethylenically unsaturated compound (b) in a polyol, wherein the content of (B) in (I) is from 35 to 75 mass %, based on the mass of (I), and the amount of soluble polymers (P) dissolved in (A) is not more than 5 mass %, based on the mass of (A), and provides methods for producing the polymer polyol composition (I). Further, this invention provides a method for producing a foamed or non-foamed polyurethane resin, which method comprises reacting a polyol component with a polyisocyanate component in the presence or absence of a blowing agent, wherein the above polymer polyol composition is used at least as a portion of the polyol component. A polymer polyol having a low viscosity and excellent dispersion stability is provided even when having a high concentration of polymer particles, and is used advantageously to produce polyurethane resins having excellent 25% ILD (hardness) and compression set, or foams thereof, with good operation efficiency.

1 Claim, No Drawings

U.S. PATENT DOCUMENTS

| | | |
|---|---|---|
| RE32,733 E | 8/1988 | Simroth et al. |
| 4,792,574 A | 12/1988 | Berkowitz |
| 4,855,330 A | 8/1989 | Gastinger et al. |
| RE33,291 E | 8/1990 | Ramlow et al. |
| 5,021,506 A | 6/1991 | Gastinger et al. |
| 5,059,641 A | 10/1991 | Hayes et al. |
| 5,070,141 A | 12/1991 | Gastinger et al. |
| 5,093,412 A | 3/1992 | Mente et al. |
| 5,171,759 A | 12/1992 | Hager |
| 5,194,493 A | 3/1993 | Hayes et al. |
| 5,196,470 A | 3/1993 | Anderson et al. |
| 5,198,473 A | 3/1993 | Gallagher et al. |
| 5,252,624 A | 10/1993 | Milliren et al. |
| 5,277,945 A | 1/1994 | Takoh et al. |
| 5,321,072 A | 6/1994 | Misono |
| 5,358,984 A | 10/1994 | Hayes et al. |
| 5,364,906 A | 11/1994 | Critchfield et al. |
| 5,395,860 A | 3/1995 | Leung et al. |
| 5,405,886 A | 4/1995 | Milliren et al. |
| 5,494,957 A | 2/1996 | Moore et al. |
| 5,496,894 A | 3/1996 | Critchfield et al. |
| 5,594,066 A | 1/1997 | Heinemann et al. |
| 5,668,378 A | 9/1997 | Treboux et al. |
| 5,677,361 A | 10/1997 | Treboux et al. |
| 5,728,745 A | 3/1998 | Allen et al. |
| 5,814,699 A | 9/1998 | Kratz et al. |
| 5,916,994 A | 6/1999 | Izukawa et al. |
| 6,013,731 A | 1/2000 | Holeschovsky et al. |
| 6,156,864 A | 12/2000 | Ohkubo et al. |
| 6,172,164 B1 | 1/2001 | Davis et al. |
| 6,248,856 B1 | 6/2001 | Sarpeshkar et al. |
| 6,291,538 B1 | 9/2001 | Okubo et al. |
| 6,417,241 B1 | 7/2002 | Huygens et al. |
| 6,433,033 B1 | 8/2002 | Isobe et al. |

# POLYMER POLYOL COMPOSITION, PROCESS FOR PRODUCING THE SAME, AND PROCESS FOR PRODUCING POLYURETHANE RESIN

TECHNICAL FIELD

The present invention relates to polymer polyol compositions for producing polyurethane resins, methods for producing the polymer polyol compositions, and a method for producing polyurethane resins or foams thereof using the obtained polymer polyols.

BACKGROUND ART

Polymer compositions or mixtures obtained by polymerizing an ethylenically unsaturated compound in a polyol are generally referred to as polymer polyols, and are used widely as the materials of polyurethane resins such as polyurethane foams or polyurethane elastomers.

It is known that the content of polymer particles in a polymer polyol may be increased to produce a polymer polyol that provides a high quality polyurethane with a greater hardness and a higher elastic modulus. Known methods to obtain such a polymer polyol include a method of polymerizing a vinyl monomer in the presence of a modified polyol, a portion of which has been allowed to react with a coupling agent (a silicon-containing compound, tetrakisalkoxy orthoformate, trialkoxyalkane, dialkoxyalkane, or the like) to increase its molecular weight (e.g. WO 85/04891), a method of polymerizing a vinyl monomer in the presence of a macromer containing an urethane bond (e.g. JP 61(1986)-115919 A), etc.

However, the polymer polyol compositions obtained by the above methods have deficiencies such as poor dispersion stability or deteriorated miscibility with an isocyanate when forming a polyurethane resin, and there were difficulties in handling. Thus, it has been difficult to obtain a polymer polyol composition having good dispersion stability even when the content of polymer particles is high.

The inventors of the present invention have made earnest investigations to solve the above problems, and found that a polymer polyol composition that provides a high quality polyurethane and has a low viscosity can be obtained by having a content of oligomers of not more than a specified amount, thus reaching the present invention. Furthermore, it was also found that the same polymer polyol composition can be obtained by mechanically dispersing or crushing a polymer polyol obtained by polymerizing a monomer in the presence of a specific dispersant, thus reaching the present invention.

Furthermore, the inventors found that the use of a specific compound having an ethylenically-unsaturated group at a terminal (hereinafter referred to as terminal ethylenically-unsaturated group containing compound) and/or a specific reactive dispersant allows the same polymer polyol composition to be obtained, thus providing the present invention.

It is an object of the present invention to provide polymer polyols having a low viscosity and very good dispersion stability even when the concentration of the polymer particles is high, and to provide methods for producing the polymer polyols. Also, it is another object of the present invention to provide a method for producing polyurethane resins or foams using these polymer polyol compositions or foams thereof, wherein the polyurethane resins or foams thereof have good operation efficiency and have high 25% ILD (hardness) and small compression set.

SUMMARY OF THE INVENTION

The present invention is as follows.

[First Invention] A polymer polyol composition (I) comprising a dispersion medium composed of a polyol (A), or (A) and a diluent (C), and polymer particles (B) dispersed in the dispersion medium, wherein the polymer particles (B) are formed by polymerizing an ethylenically unsaturated compound (b) in a polyol, or in a polyol and the diluent (C); the content of (B) in (I) is from 35 to 75 mass %, based on the mass of (I); and the amount of soluble polymers (P) dissolved in (A) is not more than 5 mass %, based on the mass of (A).

[Second Invention] A polymer polyol composition (I) comprising a dispersion medium composed of a polyol (A), or (A) and a diluent (C), and polymer particles (B) dispersed in the dispersion medium, wherein the polymer particles (B) are formed by polymerizing an ethylenically unsaturated compound (b) in a polyol, or in a polyol and (C); the content of (B) in (I) is from 35 to 75 mass %, based on the mass of (I); and the viscosity V (mPa·s) of (I) measured by a Brookfield viscosimeter at 25° C. is in the range of an inequality $$V \leq (Va - Va \times C/10)\char`\^[e\char`\^x] \quad (1)$$

where $x = 0.0010354 \times Bp\char`\^1.5$,

Va is a viscosity (mPa·s) of (A) measured by a Brookfield viscosimeter at 25° C., C is a content of (C) in (I) (mass %), Bp is a content of (B) in (I) (mass %), symbol ^ indicates a power, and symbol "e" is the base of the natural logarithm.

[Third Invention] A polymer polyol composition (II) comprising a polyol (A), and polymer particles (B) dispersed in a dispersion medium composed of a polyol (A), or (A) and a diluent (C), wherein the polymer particles (B) are formed by polymerizing an ethylenically unsaturated compound (b) in a polyol; (b) contains at least 5 mass % of an ethylenically unsaturated compound (b1) having a number-average molecular weight of at least 500; and (b) is polymerized in the presence of a dispersant (D), and in the presence or absence of a diluent (C).

[Fourth Invention] A polymer polyol composition (III) comprising a polyol (A), and polymer particles (B) dispersed in a dispersion medium composed of a polyol (A), or (A) and a diluent (C), wherein the polymer particles (B) are formed by polymerizing an ethylenically unsaturated compound (b) in a dispersion medium comprising (A) in the presence of a dispersant (D') to form polymer particles, and mechanically dispersing or crushing the polymer particles, and wherein the difference between the solubility parameter SPd of (D') and the solubility parameter SPa of (A) is not more than 0.8.

[Fifth Invention] A method for producing a polymer polyol composition, which method comprises polymerizing an ethylenically unsaturated compound (b) in a polyol (A) in the presence or absence of at least one selected from a dispersant (D) and a diluent (C), wherein the polymer polyol composition (I) or (II) of any of the first, second and third inventions is obtained using (b) containing at least 5 mass % of an ethylenically unsaturated compound (b1) having a number-average molecular weight of at least 500.

[Sixth Invention] A method for producing the polymer polyol composition (I) of the first or second invention comprising a polyol (A) and polymer particles (B) dispersed in (A), which method comprises separating the polymer particles (B) from a polymer polyol composition obtained by polymerizing an ethylenically unsaturated compound (b) in a polyol; and mechanically dispersing the polymer particles (B) in (A) not containing more than 5 mass % of soluble polymers, based on the mass of (A).

[Seventh Invention] A method for producing the polymer polyol composition (III) of the fourth invention, which method comprises polymerizing an ethylenically unsaturated compound (b) in a dispersion medium comprising a polyol (A) in the presence of a dispersant (D') to form polymer particles in a polymer polyol; and mechanically dispersing or crushing the polymer particles, wherein the difference between the solubility parameter SPd of (D') and the solubility parameter SPa of (A) is not more than 0.8.

[Eighth Invention] A polymer polyol composition comprising a dispersion medium composed of a polyol (A), or (A) and a diluent (C), and polymer particles (B) dispersed in the dispersion medium, wherein the polymer particles (B) are formed by polymerizing an ethylenically unsaturated compound (b) in the dispersion medium in the presence or absence of a dispersant (D), wherein at least 5 mass % of (b) comprises a terminal ethylenically-unsaturated group containing compound (b3) having a number-average molecular weight of 160 to 490 and a solubility parameter SPb of 9.5 to 13.

[Ninth Invention] A polymer polyol composition comprising a dispersion medium composed of a polyol (A), or (A) and a diluent (C), and polymer particles (B) dispersed in the dispersion medium, wherein the polymer particles (B) are formed by polymerizing the ethylenically unsaturated compound (b) in the dispersion medium, in the presence of 0.5 to 50 mass parts of a reactive dispersant (D1) with respect to 100 mass parts of (A), the reactive dispersant (D1) being an unsaturated polyol having a nitrogen-containing bond, which is formed by bonding a substantially saturated polyol (a) with a monofunctional active hydrogen compound (e) having at least one polymerizable unsaturated group via a polyisocyanate (f).

[Tenth Invention] A polymer polyol composition comprising a dispersion medium composed of a polyol (A), or (A) and a diluent (C), and polymer particles (B) dispersed in the dispersion medium, wherein the polymer particles (B) are formed by polymerizing the ethylenically unsaturated compound (b) in the dispersion medium, in the presence of 0.1 to 80 mass parts of a reactive dispersant (D11) with respect to 100 mass parts of (A), the reactive dispersant (D11) being an unsaturated polyol having a nitrogen-containing bond, which is formed by bonding a substantially saturated polyol (a) with a monofunctional active hydrogen compound (e) having at least one polymerizable unsaturated group via a polyisocyanate (f), and whose average value of a ratio of a number of unsaturated groups to a number of nitrogen-containing bonds originating from an NCO group in one molecule of (D11) is 0.1 to 0.4.

[Eleventh Invention] A method for producing a foamed or non-foamed urethane resin, comprising reacting a polyol component with a polyisocyanate component in the presence or absence of a blowing agent, wherein the polymer polyol composition according to any one of the above-described first through fourth and eighth through tenth inventions is used as at least a part of the polyol component.

DETAILED DESCRIPTION OF THE INVENTION

In the first invention of the present invention, the content of the polymer particles (B) dispersed in (A) in the polymer polyol composition (I) is usually from 35 to 75 mass %, preferably from 45 to 75 mass %. If the content of (B) is not less than 35 mass %, a polyurethane foam having a sufficient compressive hardness can be obtained. Furthermore, if the content of (B) is not more than 75 mass %, the polymer particles do not aggregate and settle, so that handling becomes easy.

Furthermore, in the first invention, it is necessary that the amount of the soluble polymers (P) dissolved in the polyol (A) in (I) is not more than 5 mass %, preferably not more than 3 mass %, based on the mass of (A). If the amount of (P) exceeds 5 mass %, the viscosity of the polymer polyol composition increases. As a result, handling becomes difficult, and a polyurethane foam with a low hardness is produced.

The soluble polymers (P) dissolved in the polyol (A) herein refer to the soluble polymers obtained by removing the polymer particles (B) insoluble in (A) as well as (A) (containing small amounts of by-products of low molecular weight) from the polymer polyol composition (I), and they are usually compounds having a higher molecular weight than the polyol (A).

The amount of the soluble polymers (P) is measured as follows.

20 g of methanol is added to 5 g of (I) and put in a stainless tube of 100 cc. The polymer particles (B) are allowed to aggregate by a centrifugation at 18,000 rpm for 60 minutes at a temperature of 20° C. to obtain a transparent supernatant. From this solution, methanol is removed by a pressure-reducing dryer, and then the polyol (A) (containing small amounts of by-products of low molecular weight) and the polymers (P) soluble in (A) [(P) has a molecular weight of at least 4000; in chromatography, the peak of (P) usually appears on the side of a higher molecular weight than the peak of (A)] are sampled by preparative liquid chromatography. The amount of (P) is determined from the mass ratio of the sampled (A) and (P). The soluble polymers (P) usually have a weight-average molecular weight (measured by gel permeation chromatography; hereinafter abbreviated as GPC) of 6000 to 30000, however, they may include those having a higher molecular weight.

When the soluble polymers (P) cannot be separated from the polyol (A) by preparative liquid chromatography (when the molecular weights of (P) and (A) overlap), the polymer particles (B) are allowed to aggregate by a centrifugation in the same way as the above to obtain a transparent supernatant. From this solution, methanol is removed by a pressure-reducing dryer, and then diethyl ether is added. The resulting precipitate is filtered and dried. As a result, the soluble polymers (P) can be separated from (A).

In the second invention of the present invention, the content of the polymer particles (B) in the polymer polyol composition (I) is usually from 35 to 75 mass %, preferably from 45 to 75 mass %. If the content of (B) is less than 35 mass %, a polyurethane foam having a sufficient compressive hardness cannot be obtained. Furthermore, when the content of (B) exceeds 75 mass %, the polymer particles aggregate and settle, so that handling becomes difficult.

In the second invention, the viscosity V (mPa·s) of the polymer polyol composition (I) measured by a Brookfield viscosimeter at 25° C. is usually in the range of the inequality (1) below, preferably satisfying both the inequalities (2) and (3) below:

$$V \leq (Va - Va \times C/10)^{\hat{}}[e^{\hat{}}x], \quad (1)$$

$$V \leq (Va - Va \times C/10)^{\hat{}}[e^{\hat{}}y], \text{ and} \quad (2)$$

$$V \geq 0.5 \times (Va - Va \times C/10)^{\hat{}}[e^{\hat{}}y], \quad (3)$$

where $x = 0.0010354 \times Bp^{\hat{}}1.5$, $y = 0.0009514 \times Bp^{\hat{}}1.5$, Va is a viscosity (mPa·s) of (A) measured by a Brookfield viscosimeter at 25° C., C is a content of (C) in (I) (mass %), Bp is a content of (B) in (I) (mass %), symbol ^ indicates a power, and symbol "e" is the base of the natural logarithm.

The conditions of the measurements of V and Va are as follows:

1,500 mPa·s or less; Rotor No. 3, 60 rpm
  1,500 to 3,000 mPa·s; Rotor No. 3, 30 rpm
  3,000 to 8,000 mPa·s; Rotor No. 3, 12 rpm
  8,000 to 16,000 mPa·s; Rotor No. 3, 6 rpm
  16,000 to 40,000 mPa·s; Rotor No. 4, 12 rpm, and
  40,000 to 100,000 mPa·s; Rotor No. 4, 6 rpm.

By satisfying the range of the inequality (1), the polymer polyol composition (I) can have good miscibility with other materials and also good handling properties.

In the second invention, a diluent (C) may be used as needed, and it may be contained in the polymer polyol composition so that the viscosity of the polymer polyol composition is decreased. Examples of (C) include internal olefins having 5 to 30 carbon atoms such as hexene, octene and decene; flame retardants with a low viscosity (100 mPa·s/25° C. or lower), e.g. tris(chloroethyl)phosphate and tris(chloropropyl)phosphate; and solvents, e.g. aromatic solvents such as toluene and xylene.

The content of (C) in (I) is preferably not more than 3 mass %, more preferably not more than 2 mass %, particularly preferably not more than 1 mass %. However, as described later, the content of (C) may be adjusted in the foregoing range by using a larger amount of (C) upon polymerizing the ethylenically unsaturated compound (b) and thereafter removing (C) after the polymerization by stripping.

To obtain the polymer polyol composition (I) of the first and/or second invention, for example, the following methods (i) and (ii) may be employed.

(i) [Fifth Invention] A polymer polyol composition is produced by polymerizing an ethylenically unsaturated compound (b) in a polyol (A) in the presence or absence of a dispersant (D) and/or a diluent (C), wherein (b) containing at least 5 mass % of an ethylenically unsaturated compound (b1) having a number-average molecular weight of at least 500 is used.

(ii) [Sixth Invention] A polymer polyol composition comprising a polyol (A) and polymer particles (B) dispersed in (A) is produced by separating the polymer particles (B) from a polymer polyol composition obtained by polymerizing (b) in a polyol, and mechanically dispersing the polymer particles (B) in (A) not containing more than 5 mass % of soluble polymers, based on the mass of (A).

Furthermore, the following methods (iii) to (v) may be employed.

(iii) [Method for Obtaining the Polymer Polyol Composition of the Eighth Invention] When polymer particles (B) are formed by polymerizing an ethylenically unsaturated compound (b) in the dispersion medium composed of a polyol (A), or (A) and a diluent (C) in the presence or absence of a dispersant (D), (b) containing at least 5 mass % of a terminal ethylenically-unsaturated group containing compound (b3) having a number-average molecular weight of 160 to 490 and a solubility parameter SPb of 9.5 to 13 is used.

(iv) [Method for Obtaining the Polymer Polyol Composition of the Ninth Invention] When polymer particles (B) are dispersed in the dispersion medium, the polymer particles (B) are formed by polymerizing the ethylenically unsaturated compound (b) in the dispersion medium composed of the polyol (A), or (A) and the diluent (C) in the presence of a reactive dispersant (D), 0.5 to 50 mass parts of a reactive dispersant (D1) with respect to 100 mass parts of (A) is used as the dispersant (D). Here, the reactive dispersant (D1) is an unsaturated polyol having a nitrogen containing bond, which is formed by bonding a substantially saturated polyol (a) with a monofunctional active hydrogen compound (e) having at least one polymerizable unsaturated group via a polyisocyanate (f).

(v) [Method for Obtaining the Polymer Polyol Composition of the Tenth Invention] When the polymer particles (B) are formed by polymerizing the ethylenically unsaturated compound (b) in the dispersion medium composed of the polyol (A), or (A) and the diluent (C) in the presence of a reactive dispersant (D), 0.1 to 80 mass parts of a reactive dispersant (D11) with respect to 100 mass parts of (A) is used as the reactive dispersant (D). Here, the reactive dispersant (D11) is an unsaturated polyol having a nitrogen-containing bond, which is formed by bonding a substantially saturated polyol (a) with a monofunctional active hydrogen compound (e) having at least one polymerizable unsaturated group via a polyisocyanate (f), whose average value of a ratio of a number of unsaturated groups to a number of nitrogen-containing bonds originating from an NCO group in one molecule of (D11) is 0.1 to 0.4.

Among these methods, the methods (i) and (iii) to (v) are preferred, the methods (iii) to (v) are more preferred, and the method (iii) in combination with the method (iv) or (v) is preferred in particular.

The third invention of the present invention is the polymer polyol composition (II) obtained by the method of the fifth invention using a dispersant (D) as an essential component. It is preferable that the content of the soluble polymers (P) is not more than 5 mass %, based on the mass of (A). However, the content also may be not more than 10 mass %. Furthermore, in the polymer polyol composition in the eighth to tenth inventions, the content of the soluble polymer (P) preferably is not more than 5 mass % based on the mass of (A), but it may be not more than 10 mass %, in the case where the dispersant (D) is used.

As the polyol (A) in the first to third and eighth to tenth inventions, known polyols usually used in the production of polymer polyols may be employed. For example, compounds (A1) formed by adding an alkylene oxide to a compound containing two or more (preferably 2 to 8) active hydrogen atoms (e.g. polyhydric alcohols, polyhydric phenols, amines, polycarboxylic acids and phosphoric acids) and mixtures thereof may be used.

Among these, compounds formed by adding an alkylene oxide to a polyhydric alcohol are preferred.

The polyhydric alcohols include dihydric alcohols having 2 to 20 carbon atoms (aliphatic diols, for instance, alkylene glycols such as ethylene glycol, diethylene glycol, propylene glycol, 1,3- or 1,4-butanediol, 1,6-hexanediol, and neopentylglycol; and alicyclic diols, for instance, cycloalkylene glycols such as cyclohexanediol and cyclohexanedimethanol); trihydric alcohols having 3 to 20 carbon atoms (aliphatic triols, for instance, alkane triols such as glycerol, trimethylolpropane, trimethylolethane, and hexanetriol, and triethanolamine); polyhydric alcohols having 4 to 8 hydroxyl groups and 5 to 20 carbon atoms (aliphatic polyols, for instance, alkane polyols and intramolecular or intermolecular dehydration products of the same such as pentaerythritol, sorbitol, mannitol, sorbitan, diglycerol, and dipentaerythritol; and saccharides and derivatives of the same such as sucrose, glucose, mannose, fructose, and methylglucoside).

The polyhydric phenols include monocyclic polyhydric phenols such as pyrogallol, hydroquinone and phloroglucinol; bisphenols such as bisphenol A, bisphenol F and bisphenol sulfone; and condensation products of phenols and formaldehyde (novolak).

The amines include ammonia; and aliphatic amines such as alkanol amines having 2 to 20 carbon atoms (e.g. monoethanolamine, diethanolamine, isopropanolamine and aminoethylethanolamine), alkyl amines having 1 to 20 carbon atoms (e.g. n-butylamine and octylamine), alkylene diamines having 2 to 6 carbon atoms (e.g. ethylenediamine, propylenediamine and hexamethylenediamine), and polyalkylene polyamines (from dialkylene triamines to hexaalkylene heptamines having 2 to 6 carbon atoms in the alkylene group, e.g. diethylenetriamine and triethylenetetramine).

The amines further include aromatic mono- or polyamines having 6 to 20 carbon atoms (e.g. aniline, phenylenediamine, tolylenediamine, xylylenediamine, diethyl toluenediamine, methylenedianiline, and diphenyl ether diamine); alicyclic amines having 4 to 20 carbon atoms (isophoronediamine, cyclohexylenediamine and dicyclohexylmethanediamine); and heterocyclic amines having 4 to 20 carbon atoms (e.g. aminoethylpiperazine).

The polycarboxylic acids include aliphatic polycarboxylic acids having 4 to 18 carbon atoms (e.g. succinic acid, adipic acid, sebacic acid, glutaric acid, and azelaic acid), aromatic polycarboxylic acids having 8 to 18 carbon atoms (e.g. terephthalic acid and isophthalic acid), and mixtures of two or more thereof.

As the alkylene oxide added to the active hydrogen-containing compound, alkylene oxides having 2 to 8 carbon atoms may be used. The alkylene oxides include ethylene oxide (hereinafter abbreviated as EO), propylene oxide (hereinafter abbreviated as PO), 1,2-, 1,4-, 1-3, or 2,3-butylene oxide (hereinafter abbreviated as BO), styrene oxide (hereinafter abbreviated as SO), and the like, and combinations of two or more thereof (block addition and/or random addition). Preferably, PO or a combination of PO and EO (containing not more than 25 mass % of EO) is used. The method for adding the alkylene oxide is not particularly limited, and examples of the same include known methods employing ordinary catalysts such as alkaline catalysts (for instance, KOH).

Specific examples of the polyol are adducts of PO to the active hydrogen-containing compound, and adducts of PO and other alkylene oxide (hereinafter abbreviated as AO) to the active hydrogen-containing compounds produced by the following methods, or esterification products of these adduct compounds with a polycarboxylic acid or phosphoric acid:

(i) block addition of PO-AO in this order (capped);
(ii) block addition of PO-AO-PO-AO in this order (balanced);
(iii) block addition of AO-PO-AO in this order;
(iv) block addition of PO-AO-PO in this order (active secondary);
(v) random addition of mixed PO and AO; and
(vi) random addition or block addition according to the order described in the specification of U.S. Pat. No. 4,226,756.

Furthermore, a hydroxyl equivalent of the compound (A1) is preferably 200 to 4000, more preferably 400 to 3000. Two or more types of compounds (A1) in combination having a total hydroxy equivalent in the foregoing range are preferably used as well.

As the polyol (A), the compounds (A1) formed by adding an alkylene oxide to the active hydrogen-containing compound in combination with other polyols (A2) may be used. In this case, the ratio of (A1)/(A2) used is preferably from 100/0 to 80/20 by mass.

Other polyols (A2) include high-molecular polyols such as polyester polyols and modified polyols, and mixtures thereof.

The polyester polyols include: condensation reaction products of the above described polyhydric alcohols and/or polyether polyols (e.g. dihydric alcohols such as ethylene glycol, diethylene glycol, propylene glycol, 1,3- or 1,4-butanediol, 1,6-hexanediol and neopentylglycol, mixtures of these dihydric alcohols with polyhydric alcohols having three or more hydroxyl groups, such as glycerol and trimethylol propane, and low-mole (1 to 10 moles) alkylene oxide adducts of these polyhydric alcohols) with above described polycarboxylic acids or ester-forming derivatives thereof such as anhydrides thereof or lower alkyl (the number of carbon atoms in the alkyl group: 1 to 4) esters thereof (e.g. adipic acid, sebacic acid, maleic anhydride, phthalic anhydride, dimethyl terephthalate, etc.), or with the above-described carboxylic anhydride and alkylene oxide; alkylene oxide (EO, PO, etc.) adducts of the condensation reaction products; polylactone polyol, for instance, products obtained by ring-opening polymerization of lactones ($\epsilon$-caprolactone, etc.) by using the above-described polyhydric alcohol, as an initiator; polycarbonate polyols, for instance, a reaction product of the above-described polyhydric alcohol and alkylene carbonate; and the like.

The modified polyols include polydiene polyols such as polybutadiene polyol, and hydrogenate products of the same; hydroxyl-containing vinyl polymers such as acrylic polyols; polyols based on a natural oil, such as castor oil; modification products of natural oil-based polyols; and the like.

These high molecular polyols usually have 2 to 8 hydroxyl groups, preferably 3 to 8 hydroxyl groups, and preferably have a hydroxyl equivalent of 200 to 4,000, more preferably 400 to 3,000.

The number-average molecular weight (according to gel permeation chromatography (GPC); this also applies to the number-average molecular weights described below) of the polyol (A) is usually at least 500, preferably from 500 to 20,000, particularly preferably from 1,200 to 15,000, most preferably from 2,000 to 9,000. When the number-average molecular weight of the polyol (A) is at least 500, the produced polyurethane foam is unlikely to be brittle. Furthermore, when the number-average molecular weight of (A) is not more than 20,000, the viscosity of (A) is low, and it is desirable in the aspect of the handling properties of the polymer polyol. Furthermore, the polyol (A) preferably has a hydroxyl equivalent of 200 to 4000, more preferably 400 to 3000.

When the polymer particles (B) are formed by polymerizing (b) in the sixth invention, the same as those described above for the polyol (A) also can be used. The polyol and (A) may be either the same or different.

The dispersant (D) used in the third, fifth, and eighth inventions is not particularly limited, and conventional dispersants used in polymer polyols can be employed. Two or more kinds of the dispersants (D) may be employed in combination.

Examples of (D) include: (i) macromer-type dispersants obtained by reacting a polyol with an ethylenically unsaturated compound, such as a modified polyether polyol containing a vinyl group, which is obtained by reacting at least a part of hydroxyl groups of a polyol having a weight-average molecular weight of 500 to 10000 with methylene dihalide and/or ethylene dihalide so as to have a high molecular weight, and further reacting the obtained reaction product with a vinyl group-containing compound such as a (meth)acrylic acid or a derivative of the same [e.g., glycidyl (meth)acrylate], or maleic acid or maleic anhydride, and which has a weight-average molecular weight of twice to six times the weight-average molecular weight of the polyol (e.g. see JP 08(1996)-333508 A); (ii) graft-type dispersants obtained by combining a polyol with an oligomer, such as a graft polymer having two or more segments with an affinity for polyols as side chains, in which the difference between the solubility parameter of the side chains and the solubility parameter of a polyol is not more than 1.0 (e.g., polyoxy alkylene ether groups having a number average molecular weight of 88 to 750), and having a segment with an affinity for polymers as a main chain, in which the difference between the solubility parameter of the main chain and the solubility parameter of a polymer formed from a vinyl monomer is not more than 2.0 (e.g., vinyl-based polymers having a number average molecular weight of 1000 to 30000) (e.g. see JP 05(1993)-059134 A); (iii) high molecular polyol type dispersants, e.g. a modified polyol obtained by reacting at least a portion of the hydroxyl groups in a polyol having an average molecular weight of 500 to 10000 with a methylene dihalide and/or an ethylene dihalide to increase its molecular weight to twice to six times the average molecular weight of the polyol (e.g. see JP 07(1995)-196749 A); (iv) oligomer type dispersants, e.g. a vinyl oligomer with a weight-average molecular weight of 1,000 to 30,000, at least a portion of which being soluble in polyols (e.g., acrylonitrile/styrene copolymer), and a dispersant comprising this oligomer and the vinyl group-containing modified polyether polyol described for (i) above (e.g. see JP 09(1997)-77968 A); and the like. Among these, the types (i) and (iv) are preferred. In any case, it is preferable that (D) has a number-average molecular weight (according to GPC) of 1,000 to 10,000.

Furthermore, the amount of (D) used in the case where such a conventional dispersant is used as (D) is preferably not more than 15 mass %, more preferably not more than 10 mass %, particularly preferably from 0.1 to 8 mass %, based on the mass of (b).

Apart from these conventional dispersants, reactive dispersants (D1) in the ninth and tenth inventions (including (D11)), which will be described later, may be used as the dispersant (D), and they are particularly preferred.

The reactive dispersant (D1) is an unsaturated polyol having a nitrogen-containing bond, which is formed by bonding a substantially saturated polyol (a) with a monofunctional active hydrogen compound (e) having at least one polymerizable unsaturated group via a polyisocyanate (f). Here, "substantially saturated" means that an unsaturation degree measured by the method specified in JIS K-1557 is not more than 0.2 meq/g (preferably not more than 0.08 meq/g).

As the polyol (a) composing the reactive dispersant (D1), those mentioned as the polyol (A) can be used. The polyols (a) and (A) may be the same, or may be different.

The number of hydroxyl groups in one molecule of the polyol (a) is at least two, preferably two to eight, more preferably three to four. The hydroxyl equivalent of the polyol (a) is preferably 1000 to 3000, more preferably 1500 to 2500.

The compound (e) used for obtaining (D1) is a compound having one active hydrogen-containing group and at least one polymerizable unsaturated group. Examples of the active hydrogen-containing group include a hydroxyl group, an amino group, an imino group, a carboxyl group, an SH group, etc., among which the hydroxyl group is preferred.

The polymerizable unsaturated group of the compound (e) preferably has a polymerizable double-bond, and the number of the polymerizable unsaturated groups in one molecule is preferably one to three, more preferably one. More specifically, preferred as the compound (e) is an unsaturated monohydroxy compound having one polymerizable double bond.

Examples of the foregoing unsaturated monohydroxy compound include, for instance, monohydroxy-substituted unsaturated hydrocarbons, monoesters of unsaturated monocarboxylic acids and dihydric alcohols, monoesters of unsaturated dihydric alcohols and monocarboxylic acids, phenols having alkenyl side chain groups, and unsaturated polyether monools.

Examples of the monohydroxy-substituted unsaturated hydrocarbon include: alkenol having 3 to 6 carbon atoms such as (meth)allyl alcohol, 2-butene-1-ol, 3-butene-2-ol, 3-butene-1-ol, etc.; and alkynol, for instance, propargyl alcohol.

Examples of the monoesters of unsaturated monocarboxylic acids and dihydric alcohols include monoesters of: unsaturated monocarboxylic acids each having 3 to 8 carbon atoms, for instance, acrylic acid, methacrylic acid, chrotonic acid, or itaconic acid; and the above-described dihydric alcohols (dihydric alcohols having 2 to 12 carbon atoms such as ethylene glycol, propylene glycol, and butylene glycol). Specific examples of the foregoing monoesters include 2-hydroxy ethyl acrylate, 2-hydroxy ethyl methacrylate, 2-hydroxy propyl acrylate, 2-hydroxy propyl methacrylate, 2-hydroxy butyl acrylate, 4-hydroxy butyl acrylate, etc.

Examples of the monoesters of unsaturated dihydric alcohols and monocarboxylic acids include monoesters of unsaturated dihydric alcohols having 3 to 8 carbon atoms and monocarboxylic acids having 2 to 12 carbon atoms, for instance, acetic acid monoester of butene diol.

Examples of the phenol having an alkenyl side chain group include phenols each having an alkenyl side chain group having 2 to 8 carbon atoms, such as oxystyrene, hydroxy-a-methyl styrene, etc.

Examples of the unsaturated polyether monool include 1 to 50-mole alkylene oxide (having 2 to 8 carbon atoms) adducts of the monohydroxy-substituted unsaturated hydrocarbon or the phenol having the alkenyl side chain group (for instance, polyoxyethylene (having a degree of polymerization of 2 to 10) monoallyl ether).

The examples of the compound (e) other than the unsaturated monohydroxy compound include the following:

Examples of the compound (e) having an amino group or an imino group include mono- and di-(meth)allyl amine, amino alkyl (having 2 to 4 carbon atoms) (meth)acrylate [e.g., amino ethyl (meth)acrylate], and monoalkyl (having 1 to 12 carbon atoms) amino alkyl (having 2 to 4 carbon atoms) (meth)acrylate [e.g., monomethyl amino ethylmethacrylate]; examples of the compound (e) having a carboxyl group include the aforementioned unsaturated monocarboxylic acids; and examples of the compound (e) having an SH group include compounds corresponding to the aforementioned unsaturated monohydroxy compounds (in which SH substitutes for OH).

Examples of the compound (e) having not less than two polymerizable double bonds include poly(meth)allylethers of the aforementioned polyhydric alcohols having a valence of 3, 4 to 8, or more, or polyesters of the above alcohols with the aforementioned unsaturated carboxylic acids [e.g., trimethylol propane diallylether, pentaerythritol triallylether, glycerol di(meth)acrylate, etc.]

Among these compounds, preferred are the alkenols having 3 to 6 carbon atoms, the monoesters of unsaturated monocarboxylic acids having 3 to 8 carbon atoms and dihydric alcohols having 2 to 12 carbon atoms, and the phenols having alkenyl side chain groups. More preferred are monoesters of (meth)acrylic acids with ethylene glycol, propylene glycol, or butylene glycol; allyl alcohol; and hydroxy a-methyl styrene. Particularly preferred are 2-hydroxy ethyl (meth)acrylate.

Furthermore, though the molecular weight of (e) is not particularly limited, it is preferably not more than 1000, particularly preferably not more than 500.

The polyisocyanate (f) is a compound having at least two isocyanate groups, and examples of the same include aromatic polyisocyanates, aliphatic polyisocyanates, alicyclic polyisocyanates, araliphatic polyisocyanates, modification products of these polyisocyanates (modification products having an urethane group, a carbodiimido group, an allophanate group, an urea group, a biuret group, an isocyanurate group, or an oxazolidon group, etc.), and mixtures of two or more of these.

Examples of the aromatic polyisocyanates include aromatic diisocyanates having 6 to 16 carbon atoms (excluding those contained in NCO groups; this applies to the polyisocyanates mentioned below), aromatic triisocyanates having 6 to 20 carbon atoms, crude products of these isocyanates, etc. More specifically, the examples include 1,3- and 1,4-phenylene diisocyanates, 2,4- and/or 2,6-tolylene diisocyanates (TDI), crude TDI, 2,4'- and/or 4,4'-diphenyl methane diisocyanate (MDI), crude MDI [products of crude diaminodiphenyl methane with phosgene where the crude diaminodiphenyl methane is a condensation product of formaldehyde with aromatic amine (aniline) or a mixture of the same; or is a mixture of diaminodiphenyl methane and a small amount (e.g., 5 to 20 mass %) of a polyamine having three or more functional groups; polyallyl polyisocyanate (PAPI), etc.], naphthylene-1,5-diisocyanate, triphenyl methane-4,4', 4"-triisocyanate, etc.

Examples of aliphatic polyisocyanates include aliphatic diisocyanates having 2 to 18 carbon atoms. More specifically, the examples include 1,6-hexamethylene diisocyanate, 2,2,4-trimethylhexamethylene diisocyanate, lysine diisocyanate, etc.

Examples of alicyclic polyisocyanates include alicyclic diisocyanates having 4 to 16 carbon atoms. More specifically, the examples include isophorone diisocyanate, 4,4-dicyclohexyl methane diisocyanate, 1,4-cyclohexane diisocyanate, norbornane diisocyanate, etc.

Examples of araliphatic isocyanates include araliphatic diisocyanates having 8 to 15 carbon atoms. More specifically, the examples include xylylene diisocyanate, α,α,α',α'-tetramethyl xylylene diisocyanate, etc.

Examples of modified polyisocyanates include urethane-modified MDI, carbodiimide-modified MDI, sucrose-modified TDI, castor oil-modified MDI, etc.

Among these, aromatic diisocyanates are preferred, and 2,4- and/or 2,6-TDI is more preferred.

The nitrogen-containing bond of the reactive dispersant (D1) is generated by reaction of the isocyanate group with an active hydrogen-containing group. In the case where the active hydrogen-containing group is a hydroxy group, an urethane bond is generated principally, while in the case where it is an amino group, an urea bond is generated principally. An amide bond is generated in the case of a carboxyl group, while a thiourethane group is generated in the case of a SH group. In addition to these groups, another bond, for instance, a biuret bond, an allophanate bond, etc., may be generated.

These nitrogen-containing bonds are generally classified into two kinds; those generated by reaction of a hydroxy group of the saturated polyol (a) with an isocyanate group of the polyisocyanate (f); and those generated by reaction of an active hydrogen-containing group of the unsaturated monofunctional active hydrogen compound (e) with an isocyanate group of (f).

From a viewpoint of the dispersion stability of the polymer polyol, an average of the number of the hydroxy groups in one molecule of (D1) is usually not less than 2, preferably 2.5 to 10, more preferably 3 to 7. An average of the number of the unsaturated groups in one molecule of (D1) is preferably 0.8 to 2, more preferably 0.9 to 1.2.

Furthermore, from the viewpoint of the dispersion stability, a hydroxyl equivalent of (D1) is preferably 500 to 10000, more preferably 1000 to 7000, particularly preferably 2000 to 6000.

Furthermore, from the viewpoint of the dispersion stability and ease of handling of the polyol, (D1) preferably has a number average molecular weight (in end-group analysis) of 5000 to 40000, more preferably 10000 to 30000, particularly preferably 15500 to 25000.

Furthermore, (D1) preferably has a viscosity of 10000 to 50000 mPa·s/25° C., more preferably 12000 to 48000 mPa·s/25° C., particularly preferably 15000 to 35000 mPa·s/25° C. In the case where the viscosity is in the foregoing range, the polymer has better dispersibility, thereby causing the polymer polyol obtained with use of (D1) to have a lower viscosity and providing more ease of handling.

The method for producing the reactive dispersant (D1) by employing these materials is not particularly limited.

Examples of preferable methods include a method of adding a polyisocyanate (f) to a mixture of an unsaturated monofunctional active hydrogen compound (e) and a substantially saturated polyol (a) and reacting the same in the presence of a catalyst as needed, and a method of reacting (e) and (f) in the presence of a catalyst as needed to produce an unsaturated compound having an isocyanate group and reacting the same with (a). The latter method is most preferred since the method provides an unsaturated polyol having a nitrogen-containing bond, from which a minimum of by-products such as compounds having no hydroxy group are generated.

Alternatively, (D1) may be formed by a method in which, in place of (e) or (a), a precursor of the same is reacted with (f) and thereafter the precursor portion is modified [e.g., after reacting the aforementioned precursor with isocyanate, the obtained reaction product is reacted with an unsaturated monocarboxylic acid or an ester-forming derivative of the same so as to introduce an unsaturated group, or after reacting the aforementioned precursor with isocyanate, the obtained reaction product is coupled using alkylene dihalide, or dicarboxylic acid, so as to form (D1)].

Examples of the catalyst for the foregoing reaction include conventionally used urethane catalysts such as tin-based catalysts (dibutyltin dilaurate, stannous octoate, etc.), other metal-based catalysts (tetrabutyl titanate, etc.), amine-based catalyst (triethylene diamine, etc.). Among these, tetrabutyl titanate is preferred.

An amount of the catalyst is preferably 0.0001 to 5 mass %, more preferably 0.001 to 3 mass %, based on the mass of a reaction mixture.

As to the reaction ratio of these three components, an equivalent ratio of the active hydrogen-containing groups of (e) and (a) to the isocyanate groups of (f) is preferably (1.2 to 4):1, more preferably (1.5 to 3):1 based on a total amount of the components used in the reaction.

Furthermore, an amount of (e) used in the reaction is preferably less than 2 parts by mass (mass parts), more preferably 0.5 to 1.8 mass parts, with respect to 100 mass parts of (a).

It should be noted that the following method may be used: a mixture of (D1) and (a) is formed using a significantly excessive amount of (a) for reaction with (f), and unreacted (a) is not separated but is used as it is, as a part of the polyol (A).

The reactive dispersant (D1) obtained by the foregoing methods may be a single compound, but in many cases it is a mixture of various compounds such as those expressed by a general formula (5) shown below:

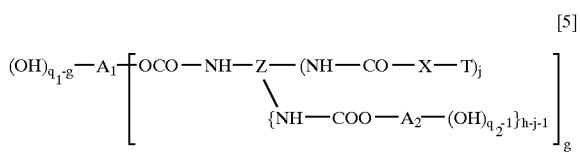

where:

z represents a residue of (f) having a valence of h (h is an integer of not less than 2);

T represents a residue of (e) (having a polymerizable unsaturated group);

$A_1$ represents a residue of a polyol having a valence of $q_1$ [OH prepolymer derived from (a), or (a) and (f)], and $A_2$ represents a residue of a polyol having a valence of $q_2$ [OH prepolymer derived from (a), or (a) and (f)] ($q_1$ and $q_2$ are integers of not less than 2); and X represents a single bond, O, S, or

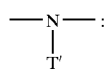

where:

T' represents H or an alkyl group having 1 to 12 carbon atoms;

$q_1-g \geq 0$;

g represents an integer of not less than 1;

j represents an integer of not less than 1:

$h-j-1 \geq 0$; and the total number of OH groups is not less than 2.

In other words, the reactive dispersant (D1) includes one polyol (a) and one compound (e) that are bonded with each other via one polyisocyanate (f), a plurality of compounds (e) and one polyol (a) that are bonded with each other via one polyisocyanate (f) for each (e), polyols (a) and compounds (e), not less than three in total, that are bonded with each other via a plurality of polyisocyanates (f), etc. Furthermore, in addition to these, a plurality of polyols (a) bonded with each other via polyisocyanates (f) (a polyol having no unsaturated group, which contains a nitrogen-containing bond) and a plurality of compounds (e) bonded with each other via polyisocyanates (f) (an unsaturated compound having no hydroxyl group, which contains a nitrogen-containing bond) may be formed as by-products, and also, the reactive dispersant (d1) may contain unreacted (a) and (e) in some cases.

These mixtures may be used as dispersants without any modification, but those containing a minimum of polyols having no unsaturated group, which contain a nitrogen-containing bond, or unsaturated compounds having no hydroxyl group, which contain a nitrogen-containing bond, are preferred, and they may be used after removing the impurities that are removable.

Furthermore, since unsaturated groups in (D1) are present at terminals or in the vicinity of terminals of molecular chains of the polyol, they are polymerizable with monomers.

A dispersant (D11) used in the tenth invention is obtained by reacting (a), (e), and (f) so that K, indicative of an average of a ratio of the number of unsaturated groups to the number of nitrogen-containing bonds originating from NCO groups in one molecule of (f), which is derived according to a formula (4), is 0.1 to 0.4:

$$K=[\text{number of moles of } (e) \times \text{number of unsaturated groups of } (e)]/[\text{number of moles of } (f) \times \text{number of NCO groups of } (f)] \quad (4)$$

The value of K is more preferably 0.1 to 0.3, particularly preferably 0.2 to 0.3. In the case where the value of K is in the foregoing range, a particularly excellent dispersion stability of polymer polyol can be obtained.

As to the composition ratio of a polyol (A) and a reactive dispersant (D1) when a polymer polyol is formed, 0.5 to 50 mass parts of (D1) is preferably used with respect to 100 mass parts of (A) [Ninth Invention]. More preferably 0.8 to 15 mass parts, or particularly preferably 1 to 10 parts, of (D1) is used with respect to 100 parts of (A). With not more than 50 mass parts of (D1), the viscosity of the polymer polyol does not increase, while with not less than 0.5 mass parts, an excellent dispersibility is obtained.

In the case of (D11), since it is excellent in dispersion stability, the ratio of use of the same can be varied in a wide range [for instance, 0.1 to 80 mass parts with respect to 100 mass parts of (A)], but the ratio is preferably in the foregoing range.

The reactive dispersants (D1) and (D11) of the ninth and tenth inventions can be used for producing conventional polymer polyol compositions in which only (b2) that will be described later is used as an ethylenically-unsaturated compound, since a polymer polyol composition obtained by using the dispersant (D1) or (D11) has excellent dispersion stability. However, these dispersants are particularly preferably used for producing a polymer polyol composition in which a specific ethylenically unsaturated group-containing compound (b1) or (b3) that will be described later are used.

In the method (i) [Fifth Invention] to obtain the polymer polyol composition (I) of the first and/or second inventions and the polymer polyol composition (II) of the third invention, an ethylenically unsaturated compound (b1) having a number-average molecular weight of at least 500 and an ethylenically unsaturated compound (b2) having a number-average molecular weight of less than 500 and usually used in the production of polymer polyol compositions may be used as the ethylenically unsaturated compound (b). Examples of (b2) include aromatic hydrocarbon monomers (b2-1), unsaturated nitrites (b2-2), (meth)acrylic acid esters (b2-3), and other ethylenically unsaturated compounds (b2-4), and mixtures of two or more thereof.

The number-average molecular weight of the ethylenically unsaturated compound (b1) is usually at least 500, preferably at least 550, particularly preferably from 800 to 10,000, most preferably from 1,000 to 10,000. By using (b1) having a number-average molecular weight of at least 500, a polymer polyol having a smaller amount of polyol-soluble oligomers can be produced.

Furthermore, the ethylenically unsaturated compound (b1) can have one or more double bonds on average. It is preferable that (b1) has from 1 to 500 double bonds, more preferably from 1 to 70 double bonds. By letting (b1) have one or more double bonds, the amount of components soluble in polyols can be decreased, and an increase in the viscosity of the polymer polyol obtained can be prevented. Moreover, the polyurethane resin produced using such a compound can be prevented from having deteriorated properties.

Furthermore, when (b1) has two or more double bonds, preferably the double bonds are non-conjugated.

Furthermore, it is preferable that the molecular weight (X) per one double bond of (b1) is usually not more than 1200, preferably not more than 1150, more preferably from 100 to 1050. When (X) is not more than 1200, a great effect is exhibited to decrease the amount of the polyol-soluble oligomers in the polymer polyol produced using (b1).

The molecular weight (X) per one double bond of (b1) is defined by the equation $$X=1000/N,$$

where N is an unsaturation degree of (b1) measured by the method specified in JIS K-1557.

It is preferable that the ethylenically unsaturated compound (b1) has an ester bond, amide bond, urethane bond, urea bond and/or imide bond, etc. in the molecule. Among these, ester bond, amide bond and/or urethane bond are preferred, and ester bond is particularly preferred. Also, a combination of two or more of these bonds can be present in the same molecule.

The ester bond can be formed by (i) a reaction of a carboxylic acid or an acid anhydride with a hydroxyl-containing compound or an alkylene oxide, or (ii) a ring-opening reaction of a lactone. The amide bond can be formed by (i) a reaction of a carboxylic acid or an acid anhydride with an amino-containing compound, (ii) a ring-opening reaction of a lactam, or (iii) a polycondensation reaction of an aminocarboxylic acid. The imide bond can be formed by reacting an acid with diamine to form a polyamic acid and then carrying out a dehydration reaction. The urethane bond or urea bond can be formed by reacting an isocyanate compound with an active hydrogen-containing compound.

Examples of the carboxylic acids for forming the ester bond and amide bond include unsaturated aliphatic mono-carboxylic acids having 3 to 24 carbon atoms, e.g. acrylic acid, methacrylic acid, oleic acid and linoleic acid; unsaturated aliphatic dicarboxylic acids having 4 to 24 carbon atoms, e.g. maleic acid, fumaric acid, itaconic acid and citraconic acid; saturated aliphatic polycarboxylic acids having 2 to 24 carbon atoms, e.g. oxalic acid, malonic acid, succinic acid, glutamic acid, adipic acid, sebacic acid, hexanetricarboxylic acid and hexanetetracarboxylic acid; aromatic polycarboxylic acids having 8 to 24 carbon atoms, e.g. isophthalic acid and terephthalic acid; alicyclic dicarboxylic acids having 7 to 24 carbon atoms, e.g. 1,4-cyclohexanedicarboxylic acid and tetrahydrophthalic acid; unsaturated carboxylic acid (co)polymers (number-average molecular weight of 1,000 to 10,000), e.g. poly(meth)acrylic acid, polyitaconic acid, copolymers of (meth)acrylic acid and maleic acid, and copolymers of (meth)acrylic acid and styrene; and the like. The term "(meth)acryl-" herein refers to "acryl-" and/or "methacryl-".

Examples of the acid anhydride for forming the ester bond or amide bond include aliphatic carboxylic acid anhydrides such as maleic anhydride, itaconic anhydride and citraconic anhydride; and aromatic carboxylic acid anhydrides such as phthalic anhydride.

Examples of the hydroxyl-containing compound for forming the ester bond include the above (A1) and (A2); polyhydric alcohols and polyhydric phenols among the active hydrogen-containing compounds described for the polyol (A); unsaturated alcohols (r) having 3 to 24 carbon atoms, e.g. allyl alcohol and propenyl alcohol; (poly)oxyalkylene ethers ($C_2$–$C_8$ in the alkylene group; polymerization degree n=1 to 30, n herein refers to the polymerization degree of the (poly)oxyalkylene segment) of unsaturated alcohols ($C_3$–$C_{24}$, e.g. (poly)oxypropylene (n=1 to 30) monoallyl ether, and (poly)oxybutylene (n=1 to 20) monopropenyl ether; and polyol polymers such as polyvinyl alcohols (saponification value 70 to 100; number-average molecular weight of 1,000 to 10,000). Examples of the alkylene oxide include those having 2 to 8 carbon atoms, e.g. ethylene oxide, propylene oxide, butylene oxide, and styrene oxide (hereinafter abbreviated as SO), and combinations of two or more thereof (block addition and/or random addition), and the like.

Example of the lactone for forming the ester bond include those having 5 to 12 carbon atoms, such as caprolactone, enantholactone, laurolactone and undecanolactone.

Examples of the active hydrogen-containing compound for forming the amide bond include the amines among the active hydrogen-containing compounds described for the polyol (A).

Example of the lactam for forming the amide bond include those having 5 to 12 carbon atoms, such as caprolactam, enantholactam, laurolactam and undecanolactam.

Examples of the aminocarboxylic acid for forming the amide bond include aminocarboxylic acids having 2 to 18 carbon atoms, e.g. amino acids such as glycine, alanine, valine, leucine, isoleucine and phenylalanine, ω-aminocaproic acid, ω-aminoenanthic acid, ω-aminocaprylic acid, ω-aminopelargonic acid, ω-aminocapric acid, 11-aminoundecanoic acid, and 12-aminododecanoic acid, and the like.

As the acid and diamine used for forming the imide bond, known acids and diamines used in the synthesis of general polyimide resins may be employed. Examples of the acid include aromatic tetracarboxylic acids having 10 to 20 carbon atoms, such as 3,4,3',4'-biphenyltetracarboxylic acid, 2,3,3',4'-biphenyltetracarboxylic acid and pyromellitic acid, anhydrides of these acids, and ester compounds of these acids. Furthermore, examples of the diamine include aromatic diamines having 6 to 18 carbon atoms such as 4,4'-diaminodiphenyl ether, p-phenylenediamine, m-phenylenediamine, and 4,4'-diaminodiphenylmethane, and the like.

As the isocyanate compound for forming the urethane bond or urea bond, known isocyanate compounds used in the synthesis of general polyurethane resins can be employed. Examples of the isocyanate compound include those mentioned above as examples of the polyisocyanate (f).

As the active hydrogen-containing compound for forming the urethane bond or urea bond, the active hydrogen-containing compounds described above for (A1), (A2) and the polyol (A) above can be employed.

In (b1) used in the method of the present invention, the ester bond, amide bond, urethane bond, urea bond, or imide bond can be obtained by a conventional reaction of esterification, amidation, urethanation, ureation or imidation.

For example, the ester bond or amide bond can be formed by putting a carboxylic acid or acid anhydride and an active hydrogen-containing compound in a reaction vessel in predetermined amounts, and causing a dehydration reaction at 50 to 250° C. The dehydration reaction can be carried out under reduced pressure, or under atmospheric pressure or increased pressure. Furthermore, the ester bond also can be obtained by an addition reaction of a carboxylic acid or acid anhydride with an alkylene oxide.

The ratio [equivalent ratio] of the carbonyl groups of the carboxylic acid or the acid anhydride to the active hydrogen atoms of the active hydrogen-containing compound is usually from 0.01:1 to 0.98:1, preferably from 0.1:1 to 0.8:1.

Known esterification catalysts can be used in the above esterification and amidation. Examples of the catalysts include antimony-based catalysts such as antimony tetraoxide; tin-based catalysts such as monobutyl tin oxide; titanium-based catalysts such as tetrabutyl titanate; zirconium-based catalysts such as tetrabutyl zirconate; metal acetate-based catalysts such as zirconyl acetate and zinc acetate; and combinations of two or more thereof. The amount of the catalyst used is usually from 0.1 to 5 mass %, based on the total mass of the carboxylic acid and the active hydrogen-containing compound.

Other than the above method, the amide bond also can be formed by putting a predetermined amount of lactam into a reaction vessel and causing a ring-opening reaction at 50 to 250° C., or by putting a predetermined amount of aminocarboxylic acid into a reaction vessel and causing a polycondensation reaction at 50 to 250° C.

The imide bond can be formed by reacting an acid with a diamine at 60 to 130° C. using an organic polar solvent, such as N-methyl-2-pyrrolidone, N,N-dimethylformamide, N,N-dimethylacetoamide or N,N-dimethylsulfoxide, thereby to synthesize an amic acid, and dehydrating it at 60 to 400° C. A catalyst can be added to accelerate the imidation reaction. Specific examples of the catalyst include basic compounds such as triethylamine and 2-methylimidazol. The amount of the catalyst is usually from 0.01 to 5 mass %, based on the total mass of the acid and the diamine.

The urethane bond or urea bond can be formed by putting an isocyanate compound and an active hydrogen-containing compound in a reaction vessel in predetermined amounts and reacting at 25 to 150° C. The isocyanate index [equivalent ratio of (NCO groups/active hydrogen atom-containing groups)×100] is usually from 80 to 140, preferably from 85 to 120, particularly preferably from 95 to 115.

When carrying out a urethanation reaction, a conventional catalyst for urethane polymerization can be used to accelerate the reaction. Examples of the catalyst include amine-based catalysts such as tertiary amines including triethylenediamine and N-ethylmorpholine; tin-based catalysts such as stannous octoate and dibutyl tin dilaurate; other metal catalysts such as lead octoate; and the like. The amount of the catalyst is usually from 0.001 to 5 mass %, based on the mass of the isocyanate compound and the active hydrogen compound.

Specific examples of the ethylenically unsaturated compound (b1) in the method of the present invention are as follows.

Examples of (b1) having one double bond in the molecule include unsaturated aliphatic dicarboxylic acid ($C_4$-$C_{24}$) diesters of aliphatic alcohol ($C_1$-$C_{24}$) (poly)oxyalkylene ($C_2$-$C_8$ in the alkylene group) ethers, e.g. maleic acid diesters of polyoxypropylene (n=4 to 30) monomethyl ethers, fumaric acid diesters of polyoxypropylene (n=3 to 30) monobutyl ethers, and itaconic acid diesters of random adducts of butanol polyoxybutylene (n=2 to 20)-polyoxyethylene (n=2 to 10); aliphatic alcohol ($C_1$-$C_{24}$) polyoxyalkylene ($C_2$-$C_8$ in the alkylene group) ether (meth) acrylates, e.g. polyoxypropylene [n=8(7) to 30] monomethyl ether (meth)acrylates [the numerical value in the parenthesis for n shows the case of methacrylate; this also applies to the following], polyoxybutylene [n=6(5) to 20] monobutyl ether (meth)acrylates, and polyoxypropylene (n=5 to 30) monolauryl ether (meth)acrylates; polyoxyalkylene ($C_2$-$C_8$ in the alkylene group) ethers of unsaturated alcohols ($C_3$-$C_{24}$), e.g. polyoxypropylene (n=4 to 30) monooleyl ethers, polyoxypropylene (n=8 to 30) monoallyl ethers; unsaturated aliphatic monocarboxylic acid ($C_3$-$C_{24}$) polyoxyalkylene ($C_2$-$C_8$ in the alkylene group) esters, e.g. random adducts of oleic acid propylene oxide (n=2 to 30)-ethylene oxide (n=2 to 10) having a number-average molecular weight of at least 500; and the like.

Examples of (b1) having two double bonds in the molecule include polyalkylene ($C_2$-$C_8$ in the alkylene group) glycol di(meth)acrylates, e.g. polypropylene glycol [n=7(6) to 30] di(meth)acrylates, and polybutylene glycol [n=6(5) to 20] di(meth)acrylates; aliphatic carboxylic acid ($C_2$-$C_{24}$) diesters of unsaturated alcohols ($C_3$-$C_{24}$), e.g. succinic acid diesters of polyoxypropylene (n=3 to 30) monoallyl ethers, adipic acid diesters of polyoxypropylene (n=3 to 30) monoallyl ethers, succinic acid diesters of polyoxypropylene (n=3 to 30) monopropenyl ethers; and the like.

Examples of (b1) having three double bonds in the molecule include unsaturated fatty acid ($C_3$-$C_{24}$) triesters of trihydric alcohols ($C_3$-$C_{12}$), e.g. tri(meth)acrylates of glycerol polyoxypropylene [n=5(4) to 30] ethers, tri(meth) acrylates of trimethylolpropane polyoxypropylene [n=4(3) to 30] ethers, tri(meth)acrylates of pentaerythritol polyoxypropylene [n=4(3) to 30] ethers, tri(meth)acrylates of diglycerol polyoxypropylene (n=3 to 30) ethers, and sorbitan polyoxybutylene [n=3(2) to 20] tri(meth)acrylates; aliphatic carboxylic acid ($C_3$-$C_{24}$) triesters of unsaturated alcohols ($C_3$-$C_{24}$), e.g. hexanetricarboxylic acid triesters of allyl alcohol (poly)oxypropylene (n=1 to 30) ethers; unsaturated alkyl-containing ether compounds, e.g. triallyl ethers of glycerol polyoxypropylene (n=5 to 30) ethers; and the like.

Examples of (b1) having four double bonds in the molecule include unsaturated fatty acid ($C_3$-$C_{24}$) polyesters of polyhydric (4 to 8 or more hydroxyl groups) alcohols, e.g. polyglycerol (n=3 to 4) poly(meth)acrylates having a number-average molecular weight of at least 500, polyglycerol (n=2 to 4) polyolates having a number-average molecular weight of at least 500, dipentaerythritol poly(meth) acrylates having a number-average molecular weight of at least 500, polyglycerol (n=2 to 4) (poly)oxypropylene (n=1 to 30) poly(meth)acrylates having a number-average molecular weight of at least 500, tetra(meth)acrylates of pentaerythritol polyoxypropylene [n=3(2) to 30] ethers, tetra (meth)acrylates of sorbitan polyoxybutylene (n=2 to 20) ethers, and polyvinyl alcohol (saponification value of 70 to 100; number-average molecular weight of 1,000 to 10,000) (meth)acrylates; polycarboxylic esters (number-average molecular weight of 1,000 to 10,000) of unsaturated alcohols ($C_3$-$C_{24}$), e.g. hexane tetracarboxylic acid esters of allyl alcohol (poly)oxypropylene (n=1 to 30) ethers, polyesters (number-average molecular weight of 1,000 to 10,000) of (meth)acrylic acid polymers and allyl alcohols, and polyesters (number-average molecular weight of 1,000 to 10,000) of maleic acid polymers and allyl alcohols; unsaturated alkyl-containing ether compounds, e.g. tetraglycerol polyallyl ethers having a number-average molecular weight of at least 500, and polyallyl ethers of polyglycerol (n=2 to 4) (poly)oxypropylene (n=1 to 30) ethers having a number-average molecular weight of at least 500; polyesters (number-average molecular weight of 500 to 10,000) of unsaturated carboxylic acids ($C_4$–$C_{22}$) and glycols, e.g. polyesters (number-average molecular weight of 500 to 10,000) of maleic acid and ethylene glycol, polyesters (number-average molecular weight of 500 to 10,000) of maleic acid and diethylene glycol, polyesters (number-average molecular weight of 500 to 10,000) of maleic acid and propylene glycol, polyesters (number-average molecular weight of 500 to 10,000) of maleic acid and 1,3- or 1,4-butanediol, polyesters (number-average molecular weight of 500 to 10,000) of itaconic acid and ethylene glycol, polyesters (number-average molecular weight of 500 to 10,000) of itaconic acid and diethylene glycol, polyesters (number-average molecular weight of 500 to 10,000) of maleic acid and polyoxypropylene glycol (n=1 to 30), polyesters (number-average molecular weight of 500 to 10,000) of itaconic acid and polyoxypropylene glycol (n=1 to 30), and polyesters (number-average molecular weight of 500 to 10,000) of fumaric acid and polyoxybutylene glycol (n=1 to 20); and the like.

Among these, ester compounds formed from an unsaturated carboxylic acid (p) and a glycol (q) and/or ester compounds formed from an unsaturated alcohol (r) and a carboxylic acid (s) are preferred. Particularly, radically polymerizable compounds formed from an unsaturated carboxylic acid (p) and a glycol (q) are preferred. The unsaturated carboxylic acid (p) is a carboxylic acid having double bonds (non-conjugated in the case of two or more double bonds) in the molecule or a derivative thereof, e.g. a carboxylic acid having 3 to 24 carbon atoms, such as acrylic acid, methacrylic acid, maleic acid, fumaric acid, itaconic acid, citraconic acid or oleic acid; or an acid anhydride such as maleic anhydride, itaconic anhydride or citraconic anhydride. Preferably, one or more carboxylic acids selected from maleic acid, fumaric acid and itaconic acid, or derivatives thereof is used.

Carboxylic acids other than those described above also can be used simultaneously as needed. Example of such carboxylic acids are aliphatic carboxylic acids having 2 to 24 carbon atoms, such as acetic acid, propionic acid, hexanoic acid, stearic acid, oxalic acid, malonic acid, succinic acid, glutamic acid, adipic acid and sebacic acid; aromatic carboxylic acids having 7 to 18 carbon atoms, such as isophthalic acid and terephthalic acid; and alicyclic carboxylic acids having 6 to 20 carbon atoms, such as 1,4-cyclohexanedicarboxylic acid and tetrahydrophthalic acid.

As the glycol (q), the polyhydric alcohols and polyhydric phenols among the active hydrogen-containing compounds previously described for the polyol (A), and the alkylene oxides having 2 to 8 carbon atoms described above can be used. Preferably, alkylene glycols such as ethylene glycol, diethylene glycol, polyethylene glycol, propylene glycol, polyoxypropylene glycol, 1,3- or 1,4-butanediol, 1,6-hexanediol and neopentyl glycol, and alkylene oxides such as EO, PO, BO and SO are used. More preferably, ethylene glycol, diethylene glycol, 1,4-butanediol, 1,6-hexanediol, neopentyl glycol, EO and PO are used.

The aromatic hydrocarbon monomers (b2-1) include styrene, α-methylstyrene, hydroxylstyrene, chlorostyrene, and the like.

The unsaturated nitrites (b2-2) include acrylonitrile, methacrylonitrile, and the like.

The (meth)acrylic acid esters (b2-3) include (meth)acrylic acid alkyl esters ($C_1$–$C_{24}$ in the alkyl group) such as methyl (meth)acrylate, butyl(meth)acrylate, nonyl(meth)acrylate, decyl(meth)acrylate, undecyl(meth)acrylate, dodecyl(meth) acrylate, tridecyl(meth)acrylate, tetradecyl(meth)acrylate, pentadecyl(meth)acrylate, hexadecyl(meth)acrylate, octadecyl(meth)acrylate, eicosyl(meth)acrylate and docosyl (meth)acrylate; hydroxypolyoxyalkylene mono(meth) acrylates; and the like.

Other ethylenically unsaturated compounds (b2-4) include (meth)acrylamide; vinyl-containing carboxylic acids and derivatives thereof, such as (meth)acrylic acid; aliphatic hydrocarbon monomers, such as ethylene and propylene; fluorine-containing vinyl monomers, such as perfluorooctylethyl methacrylate and perfluorooctylethyl acrylate; nitrogen-containing vinyl monomers, such as diaminoethyl methacrylate and morpholinoethyl methacrylate; vinyl-modified silicone; alkyl olefin compounds, such as α-olefin, β-olefin and polyisobutene; cyclic olefin compounds, such as norbornene, cyclopentadiene and norbornadiene; and the like.

Among these, (b2-1) and (b2-2) are preferred, and styrene and/or acrylonitrile are more preferred.

When using the above method (i) to obtain (I), the amount of (b1) is usually at least 5 mass %, preferably at least 10 mass %, particularly preferably from 15 to 99 mass %, most preferably from 20 to 80 mass %, based on the total amount of (b) used.

By letting the amount of (b1) be at least 5 mass %, an increase in the viscosity of the obtained polymer polyol can be prevented.

In the production of the polymer polyol compositions of the first and second inventions, as the ethylenically unsaturated compound (b) used in the methods other than the method (i) of the fifth invention, those having one or more polymerizable vinyl group and usually used in the production of polymer polyol compositions may be used. For example, (b2-1), (b2-2), (b2-3) and (b2-4) described above or mixtures of two or more thereof may be used.

Among these, (b2-1) and (b2-2) are preferred, and styrene and/or acrylonitrile are more preferred.

In the ethylenically unsaturated compounds used in the methods other than the method (i), the mass ratios of the aromatic hydrocarbon monomers (b2-1), the unsaturated nitriles (b2-2), the (meth)acrylic acid esters (b2-3) and other ethylenically unsaturated compounds (b2-4) with respect to the total amount of (b) used can be changed depending on the required properties of the polyurethane, etc. Although not particularly limited, the mass ratios are, for example, as follows.

(b2-1): usually from 0 to 100 mass %, preferably from 20 to 80 mass %.

(b2-2): usually from 0 to 95 mass %, preferably from 20 to 80 mass %.

(b2-3): usually from 0 to 50 mass %, preferably from 0 to 20 mass %.

(b2-4): usually from 0 to 10 mass %, preferably from 0 to 5 mass %.

Furthermore, when the polymer polyol (I) is obtained by the methods other than the method of the fifth invention, by using polyfunctional vinyl-containing monomers (b2-5) having two or more functional groups (preferably from 2 to 8 functional groups) as at least a portion of (b) (preferably from 0.05 to 1 mass %), the strength of the polymer can be increased. The polyfunctional vinyl-containing monomers include divinylbenzene, ethylene di(meth)acrylate, polyalkylene ($C_2$–$C_8$ in the alkylene group) glycol di(meth) acrylate, pentaerythritol triallyl ether, trimethylolpropane tri(meth)acrylate, and the like.

In the polymer polyol composition of the eighth invention, the ethylenically unsaturated compound (b) contains, as its essential component, not less than 5 mass % of a terminal-ethylenically-unsaturated-group containing compound (b3) having a number average molecular weight of 160 to 490 and a solubility parameter SPb of 9.5 to 13. The number average molecular weight of (b3) is preferably 170 to 480, more preferably 180 to 450, particularly preferably 182 to 420, most preferably 185 to 400. With a number average molecular weight of not less than 160, a polymer polyol composition has a low viscosity, which is preferable from the viewpoint of handling, and foams with a good hardness can be obtained as well. In the case where (b3) has a number average molecular weight of not more than 490, a polyurethane foam obtained using this has a good hardness.

As to the number of ethylenically unsaturated groups in (b3), not less than one ethylenically unsaturated group in average will suffice. The number is preferably 1 to 10, more preferably 1 to 2, particularly preferably 1. In the case where the number of the ethylenically unsaturated groups is less than 1 in average, soluble components in polyols increase, thereby increasing the viscosity of a polymer polyol obtained, and further, significantly impairing the properties of a polyurethane resin formed using the same. It should be noted that as long as at least one ethylenically unsaturated group of (b3) (in average) is present at a terminal, the other unsaturated groups can be present at terminals or at positions that are not terminals.

More specifically, examples of the foregoing ethylenically unsaturated groups include α-alkenyl groups such as (meth)acryloyl groups and allyl groups.

Furthermore, a molecular weight (X) per one double bond of (b3) is preferably not more than 490, more preferably 160 to 480, particularly preferably 180 to 450, most preferably 185 to 400. In the case where it is not more than 490, a significant effect of decreasing polyol-soluble olygomers in a polymer polyol produced by using the same can be achieved.

Here, the molecular weight (X) per one double bond of (b3) is defined as shown by a formula below:

$$X = 1000/N$$

where N represents an unsaturation degree of (b3) measured by the method specified in JIS K-1557.

Furthermore, (b3) usually has a solubility parameter SPb of 9.5 to 13, preferably 9.8 to 12.5, more preferably 10.0 to 12.2. In the case where SPb of (b1) is not less than 9.5, a polymer polyol produced using the same has a low viscosity. Furthermore, in the case where SPb is not more than 13, a foam obtained using the polymer polyol has an increased hardness.

The solubility parameter herein refers to the parameter expressed by the square root of the ratio of a cohesive energy density to a molar volume as follows:

$$[\text{Solubility Parameter}] = (\Delta E/V)^{1/2}.$$

In the above equation, AE indicates a cohesive energy density, and V indicates a molecular volume. The value of V is determined by the calculation of Robert F. Fedoors et al., which is described, for example, in *Polymer Engineering and Science*, Volume 14, pages 147 to 154. It is described that the solubility parameters of typical resins are, for example, as follows: as the values of vinyl-based polymers, polystyrene=10.6, polyacrylonitrile=14.4, poly(methyl methacrylate)=9.9; as the values of polyethers, polyethylene glycol=9.4, polypropylene glycol=8.7; as the values of polyolefins, polyethylene=8.6, polypropylene=8.0; as the values of polyesters, poly(ethylene terephthalate)=12.4, poly(butylene terephthalate)=11.7; and as the values of polyamides, 6-nylon=11.9, 6,6-nylon=11.9. The values of other resins also can be calculated by combining the values of respective chemical bonds shown in the table. For example, the value of polyimide is calculated from the values of pyromellitic acid and 1,4-diaminobenzene to be 19.6, and the value of polyurethane is calculated from 1,4-butanediol and diphenylmethanediisocyanate to be 12.3. However, the real values may be more or less different from these calculated values, due to a small difference in the structure or the structures at the terminals of the resins.

Examples that are preferably used as (b3) include (b31) to (b35) shown below, since with the same, an obtained polymer polyol has a low viscosity, thereby causing an obtained polyurethane foam to have a greater hardness. Two or more may be used in combination.

(b31): (poly)oxyalkylene ($C_2$–$C_8$ in the alkylene group) ether of a terminal unsaturated alcohol ($C_3$–$C_{24}$);

(b32): compound expressed by a general formula [1] shown below;

(b33): compound expressed by a general formula [2] shown below;

(b34): compound expressed by a general formula [3] shown below;

(b35): compound expressed by a general formula [4] shown below:

  [1]

  [2]

  [3]

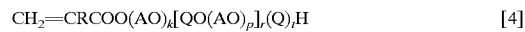  [4]

where:

R represents a hydrogen atom or a methyl group;

A represents an alkylene group having 2 to 8 carbon atoms;

Q represents a residue obtained by removing two OH groups from dicarboxylic acid;

k represents an integer of not less than 1 that provides a number average molecular weight of not more than 490;

n and p represent 0 or integers of not less than 1 that provide a number average molecular weight of not more than 490;

s represents an integer of 3 to 7;

m and r are integers of not less than 1 that provide a number average molecular weight of not more than 490; and t represents 0 or 1.

Here, the number average molecular weight mentioned in the above description, as in the phrase "provides a number average molecular weight of not more than 490", indicates a number average molecular weight of the foregoing compound.

Examples of the terminal unsaturated alcohol having 3 to 24 carbon atoms in the foregoing (b31) include allyl alcohol, 1-hexen-3-ol, etc. The number of oxyalkylene units in (b31) is usually 1 to 9, preferably 1 to 5, more preferably 1 to 3.

In the foregoing general formulae [1] to [4], A represents an alkylene group having 2 to 8 carbon atoms, an AO unit is usually formed by adding an alkylene oxide having 2 to 8 carbon atoms, and k, n, and p are equivalent to the numbers of added moles of the alkylene oxide, respectively. Furthermore, (poly)oxyalkylene units having 2 to 8 carbon atoms in the alkylene group of (b31) are also usually formed by adding an alkylene oxide having 2 to 8 carbon atoms.

Examples of the foregoing alkylene oxide include those mentioned in the description about the polyol (A) as alkylene oxides to be added to an active hydrogen-containing compound. The alkylene oxide is preferably PO and/or EO.

k is preferably 1 to 7, more preferably 1 to 5, particularly preferably 1. n is preferably either 0 or 1 to 7, more preferably either 0 or 1 to 5, particularly preferably 0. p is preferably either 0 or 1 to 6.

Examples of Q include a residue obtained by removing two OH groups from a dicarboxylic acid. Preferable examples of the dicarboxylic acid are those having 4 to 10 carbon atoms. More specifically, the examples include phthalic acid (including isophthalic acid and terephthalic acid), maleic acid, fumaric acid, and succinic acid. Phthalic acid and succinic acid are preferred.

The parts of the [CO(CH$_2$)$_s$O] unit and the [O(CH$_2$)$_s$CO] unit are usually formed by adding lactone. s is preferably 4 to 6, more preferably 5. m is preferably 1 to 5, more preferably 1 to 3, particularly preferably 2.

Furthermore, r is preferably 1 to 5, more preferably 1 or 2, particularly preferably 1.

Among these (b31) to (b35), (b31) and (b32) are more preferred, and (b31) is particularly preferred.

As to examples of (b31) to (b35), examples of (b31), for instance, includes 1 to 5-mole PO and/or EO adducts of allyl alcohol.

Examples of (b32) include an acetoacetic ester of a compound obtained by adding 1 to 5 moles of PO and/or EO to 1 mole of (meth)acrylic acid.

Examples of (b33) include a compound obtained by adding 1 to 5 moles of ε-caprolactone to a compound obtained by adding 1 to 5 moles of PO and/or EO to 1 mole of a (meth)acrylic acid, and a compound obtained by further adding 1 to 5 moles of PO and/or EO to 1 mole of the foregoing compound.

Examples of (b34) include a compound obtained by adding 1 to 5 moles of ε-caprolactone to 1 mole of a (meth)acrylic acid, and a compound obtained by further adding 1 to 5 moles of PO and/or EO to 1 mole of the foregoing compound.

Examples of (b35) include: a monoester of a compound obtained by adding 1 to 5 moles of PO and/or EO to 1 mole of a (meth)acrylic acid with the equal number of moles of succinic acid; a monoester of a compound obtained by adding 1 to 5 moles of PO and/or EO to 1 mole of a (meth)acrylic acid with the equal number of moles of maleic acid or fumaric acid; a compound obtained by preparing a monoester of a compound obtained by adding 1 to 5 moles of PO and/or EO to 1 mole of a (meth)acrylic acid with the equal number of moles of phthalic acid, then adding 1 to 5 moles of PO and/or EO to 1 mole of the foregoing monoester; and a monoester of the foregoing compound with the equal number of moles of phthalic acid.

In the polymer polyol composition of the eighth invention, an ethylenically unsaturated compound (b2') having a number average molecular weight of less than 500, which is normally used, other than (b3), may be used as the ethylenically unsaturated compound (b). Examples of (b2') include those mentioned as (b2) and other than (b3).

As (b), the aforementioned ethylenically unsaturated compounds (b1) having a number average molecular weight of not less than 500 may be used.

The content of (b3) in (b) is preferably not less than 2 mass %, more preferably 5 to 80 mass %, particularly preferably 7 to 50 mass %.

In the case where the content of (b3) is not less than 2 mass %, the obtained polymer polyol has a low viscosity. It is preferred that the content of (b3) is not less than 5 mass % [Eighth Invention], but in the case where the aforementioned reactive dispersant (D1) [including (D11)] is used, the content of the same may be less than 5 mass %. A component other than (b3) in (b) is preferably (b2').

In the present invention, the polymerization of (b) can be carried out by, for instance, radical polymerization, coordinated anionic polymerization, metathesis polymerization, Diels-Alder polymerization, and the like. Preferably, radical polymerization is employed.

Polymerization of the radically polymerizable compound can be carried out in the same way as the polymerization of conventional polymer polyols. For example, the method of polymerizing an ethylenically unsaturated compound (b) in a polyol (A) containing a dispersant (D) in the presence of a polymerization initiator (the method described in U.S. Pat. No. 3,383,351, etc.) may be employed.

Furthermore, the polymerization can be carried out either in batch or continuous systems under atmospheric pressure or increased pressure, or under reduced pressure. A diluent (C) and a chain transfer agent can be used as needed.

As the radical polymerization initiator, compounds that form a free radical to initiate polymerization may be used. Examples of the compounds include azo compounds, such as 2,2'-azobisisobutyronitrile, 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methyl propionate), 2,2'-azobis[2-(hydroxymethyl)propionitrile] and 1,1'-azobis(1-acetoxy-1-phenylethane); organic peroxides such as dibenzoyl peroxide, dicumyl peroxide, bis(4-t-butylcyclohexyl) peroxidicarbonate, benzoyl peroxide, lauroyl peroxide and persuccinic acid; and inorganic peroxides, such as persulfate and perborate. Combinations of two or more thereof also may be used.

The amount of the radical polymerization initiator used is usually from 0.05 to 20 mass %, preferably from 0.1 to 15 mass %, particularly preferably from 0.2 to 10 mass %, based on the amount of (b) used. When the amount of the polymerization initiator used is from 0.05 to 20 mass %, the polymerization degree of (b) in the polymer polyol is sufficiently high, and also the molecular weight is high. Thus, it is excellent in that a polyurethane foam having a sufficient compressive hardness can be obtained.

Examples of the diluent (C) used in the radical polymerization include: aromatic hydrocarbon-based solvents such as toluene and xylene; saturated aliphatic hydrocarbon-based solvents having 5 to 15 carbon atoms such as hexane and heptane; unsaturated aliphatic hydrocarbon-based solvents having 5 to 30 carbon atoms such as octene, nonene, and decene; ether-based solvents such as dioxane; ester-based solvents such as ethyl acetate; nitrile-based solvents such as acetonitrile; and amide-based solvents such as N,N-dimethylformamide and N,N-dimethylacetoamide. Preferred as (C) are aromatic hydrocarbon-based solvents since the obtained polymer polyol compositions have lower viscosities. More preferred is xylene.

The amount of (C) used is preferably from 0 to 50 mass %, more preferably from 1 to 40 mass %, based on the amount of (b) used.

The (C) used is preferably removed therefrom by vacuum stripping after polymerization, or alternatively (C) may be caused to remain in the polymer polyol composition or may be added anew, as needed, so that the polymer polyol composition has a further reduced viscosity. Examples of (C) to be contained therein include: the aforementioned unsaturated aliphatic hydrocarbon-based solvents; aromatic solvents; and fire retardants having a low viscosity (not more than 100 mPa·s/25° C.), for instance, tris(chloroethyl) phosphate, tris(chloropropyl)phosphate, etc.

Examples of the chain transfer agent include alkylmercaptans, such as dodecylmercaptan and mercaptoethanol; alcohols, such as isopropyl alcohol, methanol, 2-butanol and allyl alcohol; halogenated hydrocarbons, such as carbon tetrachloride, carbon tetrabromide and chloroform.

The amount of the chain transfer agent used is usually from 0 to 2 mass %, preferably from 0 to 0.1 mass %, more preferably 0 mass %, based on the amount of (b) used.

Examples of the polymerization initiator used in the polymerization methods other than radical polymerization are as follows. In the coordinated anionic polymerization, an initiator composed of an organic alkyl compound of the metals of I, II and III groups in the periodic table in combination with a salt of the metals of IV to VII groups can be used. Furthermore, in the metathesis polymerization, an initiator composed of $WCl_6$ or $MoCl_5$ in combination with an organic aluminum can be used.

In the method (ii) [Sixth Invention] to obtain the polymer polyol composition (I) comprising separating the polymer particles (B) from a polymer polyol composition obtained by polymerizing (b) in a polyol and mechanically dispersing the polymer particles (B) in (A) not containing soluble polymers, the polymer particles (B) are vinyl polymer particles or polymer particles obtained by polycondensation or polyaddition reaction, and usually have a particle size of 0.1 to 50 µm. The fine polymer particles separated from a conventional polymer polyol obtained by polymerizing an ethylenically unsaturated compound (b) in a polyol in the presence of a polymerization initiator to form a polymer polyol, adding a solvent to the polymer polyol as needed, and allowing them to settle by centrifuging are used as the polymer particles (B). Furthermore, fine polymer particles produced by emulsion polymerization or suspension polymerization, which are known as methods for producing polymer particles, also can be employed. As the polymer particles (B), it is preferable to use the particles obtained by polymerizing (b) in a polyol (A), because of the easiness of the method steps.

In the method (ii) [Sixth Invention], examples of the solvent used as needed include those mentioned as the diluent (C). As the device for mechanically redispersing in the polyol (A) the polymer obtained by adding a solvent to a polymer polyol as needed after polymerization and subjecting it to centrifugation, any device capable of dispersing or crushing using the principle of impact, shock or shear can be employed regardless of the mechanism, structure, and material thereof.

One example of the dispersing or crushing machine used in the present invention is a dispersing machine that tears and disperses a liquid by applying pressure and thereby makes it collide against a metal wall (valve) (homogenizer, manufactured by A. P. V. GAURIN, Ltd.).

The fourth invention of the present invention is a polymer polyol composition (III) comprising a polyol (A) and polymer particles (B) dispersed in (A) or a dispersion medium composed of (A) and a diluent (C), the polymer particles (B) being formed by polymerizing an ethylenically unsaturated compound (b) in a dispersion medium comprising (A) in the presence of a dispersant (D') to form polymer particles, and mechanically dispersing or crushing the polymer particles, in which the difference between the solubility parameter SPd of (D') and the solubility parameter SPa of (A) is not more than 0.8. The seventh invention is a method for producing the polymer polyol composition (III).

In the fourth invention, the polyol (A) may be used as a dispersion medium, either alone or in combination with the aforementioned diluent (C).

The content of (C) in the dispersion medium may be arbitrary. However, it is usually from 0 to 80 mass %, preferably from 1 to 50 mass %.

As the dispersant (D') used in the fourth invention, it is necessary to choose a dispersant in which the difference between the solubility parameter SPd of the dispersant and the solubility parameter SPa of the polyol is usually not more than 0.8, preferably not more than 0.6, in absolute value. By letting the difference be not more than 0.8 in absolute value, the dispersion stability of the polymer polyol is improved, and aggregation and sedimentation of the polymer particles can be prevented.

The solubility parameter herein refers to that described above.

As one example of the dispersant (D') of the present invention, the same as those described above for the dispersant (D) may be used, as long as the condition of the SP value is satisfied.

As one example of the dispersant (D'), a compound obtained by reacting polypropylene glycol with glycidyl methacrylate has a solubility parameter SPd of 8.8. This is different from the value of SPa by 0.1 when the polyether (A) is polypropylene glycol.

In the fourth invention, as the ethylenically unsaturated compound (b), known compounds having one or more polymerizable vinyl group and used in the production of polymer polyols can be employed. Specifically, the above described (b2-1), (b2-2), (b2-3) and (b2-4), and mixtures of two or more thereof may be employed.

Among these, (b2-1) and (b2-2) are preferred, and styrene and/or acrylonitrile are more preferred.

The mass ratios thereof these with respect to the total amount of (b) can be changed depending on the required properties of the polyurethane, etc., and are not particularly limited. However, one example is as follows.

(b2-1): usually from 0 to 100 mass %, preferably from 20 to 80 mass %

(b2-2): usually from 0 to 95 mass %, preferably from 20 to 80 mass %

(b2-3): usually from 0 to 50 mass %, preferably from 0 to 20 mass %

(b2-4): usually from 0 to 10 mass %, preferably from 0 to 5 mass %

By using the above-mentioned polyfunctional vinyl-containing monomers (b2-5) having two or more functional groups (preferably from 2 to 8 functional groups) at least in a portion of (b) (preferably from 0.05 to 1 mass %), the strength of the polymer can be increased.

The polymer polyol of the fourth invention is characterized in that it has a low viscosity even when the content of the polymer particles in the polymer polyol is high. The content of the polymer particles is usually from 30 to 75 mass %, preferably from 40 to 70 mass %, more preferably from 45 to 60 mass %. When the content of the polymer particles is at least 30 mass %, a polyurethane foam having a sufficient compressive hardness can be obtained, and this is preferred. Furthermore, by letting the content of the polymer particles be not more than 75 mass %, aggregation and sedimentation of the polymer particles can be prevented, and the polymer polyol can exhibit good handling properties.

In the fourth invention, the polymerization of the polymer polyol can be carried out in the presence of a dispersant (D') in the same manner as the above polymerization method described for a conventional polymer polyol.

In the fourth invention, as the polymerization initiator used in the polymerization of the polymer polyol, the radical polymerization initiator described above for the first and second inventions, etc. can be employed.

The amount of the radical polymerization initiator used is usually from 0.05 to 10 mass %, preferably from 0.1 to 5 mass %, more preferably from 0.2 to 2.5 mass %, based on the mass of the ethylenically unsaturated compound (b). By letting the amount of the polymerization initiator used be at least 0.05 mass %, a decrease in the polymerization degree of (b) can be prevented, and the content of the polymer particles formed from (b) in the polymer polyol can be sufficiently high. Furthermore, by letting the amount of the polymerization initiator used be not more than 10 mass %, a decrease in the molecular weight of the polymer particles can be prevented, and a polyurethane foam having a sufficient compressive hardness can be obtained.

Furthermore, if necessary, the polymerization can be carried out in the presence of the aforementioned chain transfer agent.

In the fourth invention, the polymer polyol (III) can be obtained by physically and mechanically dispersing or crushing the polymer particles dispersed in the polymer polyol obtained by polymerization. In this case, the polymer particles (B) are not separated temporally from a polymer polyol. But the polymer particles (B) are retained in a polymer polyol, and are dispersed further mechanically. For example, the polymer polyol may be dispersed further by (i) forwarding it from a polymerization reaction vessel to a dispersing or crushing machine; or by (ii) forwarding it from a polymerization vessel to a reservoir and storing it temporarily, and then forwarding it to a dispersing or crushing machine. The mechanism of the dispersing or crushing is, for example, to utilize impact or shock, or shear. With the ability of dispersing or crushing by utilizing these principles, any device can be used regardless of its mechanism, structure and material. One example of the dispersing or crushing machine used in the present invention is a dispersing machine that tears and disperses a liquid by applying pressure to the liquid and make it collide against a valve (homogenizer; manufactured by A. P. V. GAURIN, Ltd.).

The polymer particles (B) in the polymer polyol after polymerization usually have a particle size of not more than 3 µm, preferably not more than 2 µm. The polymer polyol containing these polymer particles is put in a dispersing or crushing machine, and dispersed or crushed forcefully, so that the size of the polymer particles (B) is reduced. Thus, the polymer polyol (III) is obtained. The particle size of the polymer particles after dispersing or crushing is usually not more than 1 µm, preferably not more than 0.5 µm. [The particle size is measured by a light scattering particle size distribution meter LA-700 (manufactured by HORIBA, Ltd.).]

The temperature after dispersing or crushing is in the range of 0° C. to 100° C., preferably 5° C. to 50° C. Furthermore, when the polymer particles (B) in the polymer polyol are mechanically dispersed or crushed, the polymer polyol may be diluted with a solvent, if necessary. As the solvent, those exemplified above for (C) can be employed. The mechanical dispersing or crushing of the polymer polyol is usually carried out from 1 to 20 times, preferably from 2 to 10 times. The solvent is removed under reduced pressure after dispersing.

The removal of the solvent is carried out under atmospheric pressure or reduced pressure (e.g. reduction degree of 20 to 30 mmHg) at a temperature of 60 to 100° C. It is preferable that the remainder of the solvent is not more than 50 ppm with respect to the polymer polyol.

In the fourth invention, the content of the polymer particles in the polymer polyol is usually from 30 to 75 mass %, and the viscosity of the polymer polyol obtained by polymerization is from 2,000 to 100,000 mPa·s (25° C.). Furthermore, the viscosity resulting from the physical and mechanical dispersing or crushing after polymerization is from 500 to 20,000 mPa·s (25° C.).

In the fourth invention, the viscosity of the polymer polyol (III) may be changed depending on the content of the polymer particles. However, it is usually from 500 to 20,000 mPa·s (25° C.), preferably from 700 to 15,000 mPa·s (25° C.). By letting the viscosity of the polymer polyol (III) be not more than 20,000 mPa·s (25° C.), the polymer polyol can exhibit good handling properties. Furthermore, by letting the viscosity of the polymer polyol (III) be at least 500 mPa·s (25° C.), a polyurethane foam having a more sufficient compressive hardness can be obtained.

Among the methods of the fifth, sixth, and seventh inventions, the methods of the fifth and sixth inventions are preferred, and the method of the fifth invention is more preferred. However, as described above, as methods for obtaining the polymer polyol compositions of the first and second inventions, the methods (iii) to (v) are particularly preferred, and the method (iii) in combination with the method (iv) or (v) is most preferred.

The eleventh invention of the present invention is a method for producing a polyurethane resin using any of the polymer polyol compositions of the first to fourth and eighth to tenth inventions at least in a portion of a polyol component.

In the method for producing a polyurethane resin by reacting a polyol component with a polyisocyanate component in the presence of a catalyst, a blowing agent, a foam stabilizer and other additives as needed, the polymer polyol compositions of the present invention can be used in combination with known other active hydrogen atom-containing compounds, if necessary, as a polyol component. As the other active hydrogen atom-containing compound, other types of high molecular polyols or monools (T) and low molecular active hydrogen atom-containing compounds (U) normally used in the production of polyurethane can be used.

As the other types of high molecular polyols or monools (T), polyether polyols, polyester polyols, the other various types of polyols and monools, and modified polyols; and mixtures thereof can be used.

The polyether polyols include those exemplified above for the polyol (A1).

The polyester polyols include polyester polyols mentioned above as examples of (A2), and the like.

Examples of the other various types of polyols or monools include: diene-type polyols such as polybutadiene polyol, and hydrogen-added products of the same; hydroxyl group-containing vinyl polymers such as acryl-base polyols; polyols based on natural oils such as castor oil; modification products of natural oil-based polyols; terminal radical-polymerizable-functional group-containing active hydrogen compound disclosed in EP 1 006 133; high-molecular polyols other than those specifically mentioned in the present specification.

These other types of high-molecular polyols or monools (T) preferably have from 2 to 8 hydroxyl groups, further preferably from 3 to 8 hydroxyl groups; and usually have a hydroxyl equivalent of not less than 200, preferably 300 to 4000, more preferably 400 to 3000.

The polyether polyols are particularly preferred.

As the low molecular active hydrogen atom-containing compounds (U), compounds having at least two (preferably from 2 to 3, more preferably 2) active hydrogen atoms (hydroxyl group, amino group, mercapto group, etc., preferably hydroxyl group) and having an equivalent of less than 200 (preferably from 30 to 180) per one active hydrogen atom. The compound (U) preferably has a molecular weight of not more than 500, more preferably from 60 to 400. Examples of the compound (U) include low molecular polyols and amino alcohols.

The low molecular polyols include dihydric alcohols, such as ethylene glycol, diethylene glycol, propylene glycol, dipropylene glycol, 1,4-butanediol, neopentyl glycol and hexane diol; polyhydric alcohols having three or more hydroxyl groups, such as glycerol, trimethylolpropane, pentaerythritol, diglycerol, a-methylglucoside, sorbitol, xylytol, mannitol, dipentaerythritol, glucose, fructose and sucrose; alkylene oxide adducts of polyhydric alcohols, having a low molecular weight (e.g. molecular weight of 200 to 400), e.g. polyethylene glycol and polypropylene glycol; and low molecular diols having a ring structure, e.g. PO adducts of bisphenol A. The amino alcohols include mono- or dialkanol amines (e.g. monoethanol amine, diethanol amine, monopropanol amine, etc.).

Among these preferred are the low molecular polyols, particularly diols. Specific examples are ethylene glycol, 1,4-butanediol, neopentyl glycol, 1,6-hexanediol, and mixtures of two or more thereof.

In the method for producing a polyurethane according to the eleventh invention, the amount of the polymer polyol composition of the present invention in the polyol component (Z) [the polymer polyol composition, and as needed (T) and/or (U)] is preferably at least 5 mass %, more preferably at least 10 mass %, particularly preferably at least 20 mass %. When the amount of the polymer polyol composition is at least 5 mass %, a desired compressive hardness of a polyurethane foam can be obtained easily. The content of (B) in the polyol component (Z) is preferably from 5 to 75 mass %, more preferably from 7 to 55 mass %. In the case where the amount is in the foregoing range, excellent foam hardness and excellent flowability of the foam forming material mixture can be obtained.

Furthermore, it is preferable that the content of (T) is from 0 to 95 mass %, more preferably from 0 to 80 mass %. When the content of (T) is not more than 95 mass %, a desired compressive strength of a polyurethane foam can be obtained easily.

Furthermore, it is preferable that the content of (U) is from 0 to 30 mass %, more preferably from 0 to 10 mass %. When the content of (U) is not more than 30 mass %, the temperature of the developed heat at the time of reaction does not become too high, so that the risk of scorching is eliminated.

As the polyisocyanate component used when producing a polyurethane resin of the eleventh invention, known organic polyisocyanates traditionally used for producing polyurethane resins can be employed.

Such polyisocyanates include those mentioned above as examples of the polyisocyanate (f).

Among these preferred are 2,4- and 2,6-TDI, mixtures of isomers thereof, and crude TDI; 4,4'- and 2,4'-MDI, mixtures of isomers thereof, and crude MDI; and modified polyisocyanates derived from these polyisocyates and containing a urethane group, carbodiimide group, allophanate group, urea group, biuret group or isocyanurate group.

The isocyanate index [equivalent ratio of (NCO groups/active hydrogen atom-containing groups)×100] when producing a polyurethane resin is usually from 80 to 140, preferably from 85 to 120, more preferably from 95 to 115. Furthermore, the isocyanate index also can be considerably higher than the above range (e.g. from 300 to 1000) to incorporate a polyisocyanate group in the polyurethane.

When producing a polyurethane resin, a catalyst normally used in a polyurethane-forming reaction may be used to accelerate the reaction. For example, amine-based catalysts (e.g. tertiary amines such as triethylenediamine and N-ethylmorpholine; 1,8-diaza-bicyclo[5.4.0]undecene-7 ("DBU" produced by San-Apro Ltd.), etc.), tin-based catalysts (e.g. stannous octoate, dibutyl tin dilaurate, etc.), other metal catalysts (e.g. lead octoate), and isocyanurating catalysts disclosed in U.S. Pat. No. 4,299,924 may be employed. Among these, preferred are amine-based catalysts and/or tin-based catalysts. The amount of the catalyst is preferably from 0.001 to 5 mass %, based on the mass of the reaction mixture.

In the method of the eleventh invention, the polyurethane reaction may be carried out in the presence of a normally used blowing agent as needed, so that a polyurethane foam (preferably having a foaming rate of 5 to 100) is obtained.

As the blowing agent, at least one selected from hydrogen atom-containing halogenated hydrocarbons, water, low boiling point hydrocarbons, liquefied carbon dioxide, and the like may be used.

Specific examples of the hydrogen atom-containing halogenated hydrocarbons are those of HCFC (hydrochlorofluorocarbon) type (e.g. HCFC-123, HCFC-141b, HCFC-22 and HCFC-142b); those of HFC (hydrofluorocarbon) type (e.g. HFC-134a, HFC-152a, HFC-356mff, HFC-236ea, HFC-245ca, HFC-245fa and HFC-365mfc); and the like.

Among these, preferred are HCFC-141b, HFC-134a, HFC-356mff, HFC-236ea, HFC-245ca, HFC-245fa and HFC-365mfc, and combinations of two or more thereof.

The low boiling point hydrocarbons usually have a boiling point of −5 to 70° C. Specific examples thereof include butane, pentane, cyclopentane, and mixtures thereof.

When a hydrogen atom-containing halogenated hydrocarbon compound is used, the amount used is usually not more than 50 mass parts, preferably from 5 to 45 mass parts, with respect to 100 mass parts of the total polyol component (Z).

When a low boiling point hydrocarbon is used, the amount used is usually not more than 45 mass parts, preferably from 5 to 40 mass parts, with respect to 100 mass parts of (Z).

When liquefied carbon dioxide is used, the amount used is usually not more than 30 mass parts, preferably from 5 to 25 mass parts, with respect to 100 mass parts of (Z).

When a combination of a hydrogen atom-containing halogenated hydrocarbon and water is used, the amount of the hydrogen atom-containing halogenated hydrocarbon used is usually not more than 45 mass parts, preferably from 5 to 40 mass parts, with respect to 100 mass parts of (Z), and the amount of water used is usually not more than 10 mass parts, preferably from 0.5 to 8 mass parts, with respect to 100 mass parts of (Z).

When a combination of a low boiling point hydrocarbon and water is used, the amount of the low boiling point hydrocarbon used is usually not more than 40 mass parts, preferably from 2 to 35 mass parts, with respect to 100 mass parts of (Z), and the amount of water used is usually not more than 10 mass parts, preferably from 0.5 to 8 mass parts, with respect to 100 mass parts of (Z).

When a combination of liquefied carbon dioxide and water is used, the amount of the liquefied carbon dioxide used is usually not more than 25 mass parts, preferably from 0.1 to 20 mass parts, with respect to 100 mass parts of (Z), and the amount of water used is usually not more than 10 mass parts, preferably from 0.5 to 8 mass parts, with respect to 100 mass parts of (Z).

When water alone is used as the blowing agent, the amount of water used is usually from 0.1 to 30 mass parts, preferably from 1 to 20 mass parts, with respect to 100 mass parts of (Z).

In the method of the eleventh invention, if necessary, the reaction may be carried out in the presence of a foam stabilizer or other additive, such as those described below.

For example, the reaction can be carried out in the presence of a known additive, such as a foam stabilizer (based on dimethyl siloxane, polyether modified dimethyl siloxane, etc.), a coloring agent (dyes, pigments, carbon black, etc.), a plasticizer (phthalic acid esters, adipic acid esters, etc.), an organic filler (synthetic staple fibers, hollow microsphere composed of a thermoplastic or thermosetting resin, etc.), an inorganic filler [inorganic salts (calcium carbonate, barium sulfate, etc.), inorganic fibers (glass fibers, carbon fibers, etc.), whiskers (potassium titanate whisker, etc.)], a flame retardant (phosphoric acid esters, halogenated phosphoric acid esters, melamines, phosphazene derivatives, etc.), an age retardant (based on triazole, benzophenone, etc.), an antioxidant (based on hindered phenol, hindered amine, etc.), an adhesive (modified polycaprolactone polyol, etc.), an internal mold release agent, an antibacterial agent, or the like.

The amounts of these additives used with respect to 100 mass parts of the polyol component (Z) are as follows. The amount of the foam stabilizer used is preferably not more than 10 mass parts, more preferably from 0.2 to 5 mass parts. The amount of the coloring agent used is preferably not more than 1 mass parts. The amount of the plasticizer used is preferably not more than 10 mass parts, more preferably not more than 5 mass parts. The amount of the organic filler used is preferably not more than 50 mass parts, more preferably not more than 30 mass parts. The amount of the inorganic filler used is preferably not more than 50 mass parts, more preferably not more than 30 mass parts. The amount of the flame retardant used is preferably not more than 20 mass parts, more preferably from 5 to 15 mass parts. The amount of the age retardant used is preferably not more than 1 mass parts, more preferably from 0.01 to 0.5 mass parts. The amount of the antioxidant used is preferably not more than 1 mass parts, more preferably from 0.01 to 0.5 mass parts. Among the aforementioned additives, the amount of the additives other than these is preferably not more than 1 mass part.

Production of a polyurethane resin can be carried out by conventional methods, for example, one shot method, semi-prepolymer method, prepolymer method, and the like.

In the production of a polyurethane resin, normally used production devices can be employed. When no solvent is used, for example, a device such as a kneader or extruder can be employed. For example, various types of non-foamed or foamed polyurethane resins can be produced within a closed or open mold. A packing rate [(density on mold foaming/density on free foaming)×100] in the case where a foamed polyurethane resin is produced using a closed mold is preferably 110 to 200% In the production of a polyurethane resin, usually the materials are mixed and reacted using a mechanical device at a low pressure or high pressure. Furthermore, in the production of a polyurethane resin, the air dissolved in the materials or a gas such as air intermixed at the time of mixing can be removed by a vacuum method before or after mixing the raw materials (particularly before mixing the raw materials).

The polymer polyols obtained by the methods of the present invention are useful for producing polyurethane foam, particularly flexible molded foams and slabstock foams. Furthermore, the polymer polyols also can be used for molding by the RIM (reaction injection molding) method. The polyurethane resin produced using the polymer polyol composition of the present invention is employed as, for instance, polyurethane foams used in interiors of cars, and interior fittings such as furniture. Furthermore, they are used as materials for sealants, synthetic leather, etc.

EXAMPLES

The present invention is described further in detail with reference to the following examples. However, the present invention is not limited to these examples in any way. In the following, the values of parts, percentage, and ratio indicate those of mass parts, mass percentage, and mass ratio, respectively.

The compositions, symbols, etc. of the materials used in the examples and comparative examples are as follows:

(1) Polyol (A)
  G50: a polyol obtained by adding on average 50 moles of PO to glycerol, and having a number-average molecular weight (hereinafter also referred to as Mn) of 3,000, a hydroxyl value of 56, and a viscosity of 500 mPa·s (25° C.).

(2) Reactive Unsaturated Group-Containing Carboxylic Acid (p)
  MA: maleic anhydride
  IA: itaconic anhydride (3) Saturated Carboxylic Acid
  AA: adipic acid
  FA: phthalic acid (4) Glycol (q)
  EG: ethylene glycol
  DEG: diethylene glycol
  PP-200: polyoxypropylene glycol (number-average molecular weight of 200)
  PP-400: polyoxypropylene glycol (number-average molecular weight of 400)
  PO: propylene oxide (5) Other Ethylenically Unsaturated Compound (b2)
  AN: acrylonitrile
  St: styrene (6) Dispersant (D)
  GMAP: equimolar glycidyl methacrylate adducts of polypropylene glycol (number-average molecular weight of 3,000)
  SAN: acrylonitrile/styrene=80/20 mass % copolymer (number-average molecular weight of 5,000)
  Reactive dispersant (D1-1): dispersant produced in Preparation Example 11

Reactive dispersant (D1-2): dispersant produced in Preparation

Example 12

Reactive dispersant (D1-3): dispersant produced in Preparation

Example 13

(7) Polymerization Initiator
AVN: 2,2'-azobis(2,4-dimethylvaleronitrile)
(8) Organic Polyisocyanate
TDI-80: "CORONATE T-80" [manufactured by NIPPON POLYURETHANE INDUSTRY CO., LTD.]
(9) Catalyst
Catalyst A: "Neostann U-28" (stannous octoate) [manufactured by NITTO KASEI CO., LTD.]
Catalyst B: "DABCO" (triethylenediamine) [manufactured by NIPPON NYUKAZAI CO, LTD.]
Catalyst C: "DABCO33LV" (33 mass % dipropylene glycol solution of DABCO) [manufactured by SANKYO AIR PRODUCTS CO., LTD.]
TBT: tetrabutyl titanate [manufactured by NACALAI TESQUE, INC.]
(10) Foam Stabilizer
"F-242T": polyether siloxane polymer [manufactured by Shin-Etsu Silicone Co., Ltd.]
Compositions etc. of materials used in Preparation Examples 11 to 13, expressed by abbreviations, are as follows.
(11) Unsaturated Monofunctional Active Hydrogen Compound (e)
HEMA:2-hydroxy ethyl methacrylate;
HEA: 2-hydroxy ethyl acrylate,
(12) Reactive Dispersant-Producing Catalyst
TBT: tetrabutyl titanate [manufactured by NACALAI TESQUE, INC.]
(13) Reactive Dispersant Producing Polyisocyanate (f)
TDI: "CORONATE T-80" [manufactured by NIPPON POLYURETHANE INDUSTRY CO., LTD.]
(14) Polyol (a)
Polyol (a-1): polyol obtained by adding 104 moles in average of PO to pentaerythritol and subsequently adding 19 moles in average of EO, the polyol having a content of EO of 12% and a hydroxyl value of 32.

Furthermore, the number-average molecular weight, unsaturation degree, viscosity, polyol-soluble polymer, and dispersion stability were measured as follows.

[Number-Average Molecular Weight]
Machine type: HLC-8120GPC (liquid chromatograph manufactured by TOSOH CORPORATION)

| Columns: | TSK gel Super H4000 +TSK gel Super H3000 +TSK gel Super H2000 (all are manufactured by TOSOH CORPORATION) |
|---|---|
| Column temperature: | 40° C. |
| Detector: | RI (Refractive Index) |
| Solvent: | tetrahydrofuran |
| Flow rate: | 0.6 ml/min |
| Concentration of sample: | 0.25 mass % |
| Injected amount: | 10 μl |
| Standard: | polystyrene (manufactured by TOSOH CORPORATION; TSK STANDARD POLYSTYRENE) |

[Unsaturation Degree]
Unsaturation degree was measured in accordance with the method specified in JIS K-1557.

[Viscosity]
Machine type: BL-type viscosimeter (manufactured by TOKIMEC INC.)
Measurement temperature: 25° C.
Rotor No.: No. 3 or No. 4
Rotation count: According to the rotation count described above with respect to the measurement of viscosity in the description of the inequality (1) concerning the viscosity of V(mPa·s).

[Polyol-Soluble Polymer]
Polyol-soluble polymer was measured according to the above described method. However, in preparative liquid chromatography, the following conditions were used.
Machine type: LC-09 (manufactured by NIHON BUNSEKIKOGYO CO., LTD.)

| Columns: | JAIGEL-1H +JAIGEL- 2H +JAIGEL- 3H (All are manufactured by NIHON BUNSEKIKOGYO CO., LTD.) |
|---|---|
| Column temperature: | 40° C. |
| Detector: | RI |
| Solvent: | chloroform |
| Flow rate: | 2.5 ml/min |
| Concentration of sample: | 0.25 mass % |
| Injected amount: | 4 ml × 12 times |

[Dispersion Stability—1]
(i) A polymer polyol composition was put into a sealed 140 ml-volume container made of glass (sample bottle), and allowed to stand in a thermostat at 50° C. for 30 days.
(ii) Thereafter, dispersion stability was estimated visually.
Standard of Evaluation
○: There was no sediment, and dispersion was uniform.
Δ: There was a sediment, but it was redispersed uniformly after tipping the sample bottle down five times.
X: There was a sediment, and it was not redispersed after tipping the sample bottle down five times.

[Dispersion Stability—2]
(i) A polymer polyol composition was put into a sealed 140 ml-volume container made of glass (sample bottle), and allowed to stand in a thermostat at 70° C. for 30 days.
(ii) Thereafter, dispersion stability was estimated visually.
Standard of Evaluation
○: There was no sediment, and dispersion was uniform.
Δ: There was a sediment, but it was redispersed uniformly after tipping the sample bottle down five times.
X: There was a sediment, and it was not redispersed after tipping the sample bottle down five times.

Preparation Example 1

Preparation of a Radically Polymerizable Compound—1

Into a four-neck flask of 1-liter volume equipped with a Dimroth condenser and a Dean-Stark trap, 98 parts of MA and 440 parts of PP-400 were put. After substituting nitrogen for the air in the flask, the temperature of the mixture was increased to 80° C. while stirring the mixture in the nitrogen atmosphere (until the reaction was completed), and the temperature was maintained for 1 hour. Then, the temperature of the mixture was increased to 170° C., and allowed to react at the same temperature for 6 hours. Then, 0.02 parts of TBT was put into the flask, and allowed to react at 170° C. for 2 hours. Thus, an unsaturated polyester (b1(i)) having a number-average molecular weight of 5400, a hydroxyl value of 21 mgKOH/g and an unsaturation degree of 1.86 (X=538) was obtained. In the above, X is the molecular weight per one double bond as defined previously.

Preparation Example 2

Preparation of a Radically Polymerizable Compound—2

Using the same apparatus and method as in Preparation Example 1, and using 294 parts of MA and 800 parts of PEG-200, an unsaturated polyester (b1(ii)) having a number-average molecular weight of 1094, a hydroxyl value of 103 mgKOH/g and an unsaturation degree of 2.74 (X=365) was obtained.

Preparation Example 3

Preparation of a Radically Polymerizable Compound—3

Using the same apparatus and method as in Preparation Example 1, and using 98 parts of MA and 240 parts of PP-200, an unsaturated polyester (b1(iii)) having a number-average molecular weight of 3400, a hydroxyl value of 33 mgKOH/g and an unsaturation degree of 2.96 (X=338) was obtained.

Preparation Example 4

Preparation of a Radically Polymerizable Compound—4

Using the same apparatus and method as in Preparation Example 1, and using 118 parts of IA and 440 parts of PP-400, an unsaturated polyester (b1(iv)) having a number-average molecular weight of 5600, a hydroxyl value of 20 mgKOH/g, and an unsaturation degree of 1.79 (X=559) was obtained.

Preparation Example 5

Preparation of a Radically Polymerizable Compound—5

Into a pressure reaction device of 1.5-liter volume, 98 parts of MA, 400 parts of PP-400, 296 parts of FA, and 0.11 part of N-ethylmorpholine were put. After substituting nitrogen for the air in the flask, the temperature of the mixture was increased to 120° C. while stirring it in the nitrogen atmosphere (until the reaction was completed), and the temperature was maintained for 2 hours. Then, 232 parts of PO was blown into the reaction mixture at 120° C. and at a pressure of 0.3 mPa·s over 6 hours. Then, it was allowed to react at 120° C. for another two hours. Thus, an unsaturated polyester (b1(v)) having a number-average molecular weight of 1100, a hydroxyl value of 102 mgKOH/g and an unsaturation degree of 0.98 (X=1020) was obtained.

Preparation Example 6

Preparation of a Radically Polymerizable Compound—6

Using the same apparatus and method as in Preparation Example 1, and using 280 parts of MA and 370 parts of DEG, an unsaturated polyester (b1(vi)) having a number-average molecular weight of 1000, a hydroxyl value of 112 mgKOH/g and an unsaturation degree of 4.34 (X=230) was obtained.

Preparation Example 7

Preparation of a Radically Polymerizable Compound—7

Using the same apparatus and method as in Preparation Example 1, and using 390 parts of MA and 284 parts of EG, an unsaturated polyester (b1(vii)) having a number-average molecular weight of 920, a hydroxyl value of 122 mgKOH/g and an unsaturation degree of 5.49 (X=182) was obtained.

Example 1

Production of a Polymer Polyol Composition (Hereinafter also Referred to as Polymer Polyol)—1

Into a four-neck flask of 1-liter volume equipped with a Dimroth condenser, 10 parts of SAN and 440 parts of G50 were put. After substituting nitrogen for the air in the flask, while stirring the mixture in the nitrogen atmosphere (until the polymerization was completed), the temperature of the mixture was increased to 130° C. Then, a material previously prepared by mixing 250 parts of the unsaturated polyester (b1(i)), 150 parts of AN and 100 parts of St, and a material previously prepared by mixing 50 parts of G50 and 1 part of AVN were dropped continuously over 1 hour, each using a dropping pump, at the same time. The reaction mixture was polymerized at 130° C. for 2 hours, and a polymer polyol (F-1) having a content of polymer particles of 50%, a hydroxyl value of 28 mgKOH/g and a viscosity of 4500 mPa·s (25° C.) was obtained.

Example 2

Production of a Polymer Polyol—2

Into a four-neck flask of 1-liter volume equipped with a Dimroth condenser, 10 parts of SAN and 390 parts of G50 were put. After substituting nitrogen for the air in the flask, while stirring the mixture in the nitrogen atmosphere (until the polymerization was completed), the temperature of the mixture was increased to 130° C. Then, a material previously prepared by mixing 200 parts of the unsaturated polyester (b1(ii)), 150 parts of AN and 200 parts of St, and a material previously prepared by mixing 50 parts of G50 and 1 part of AVN were dropped continuously over 1 hour, each using a dropping pump, at the same time. The reaction mixture was polymerized at 130° C. for 2 hours, and a polymer polyol (F-2) having a content of polymer particles of 55%, a hydroxyl value of 25 mgKOH/g and a viscosity of 4800 mPa·s (25° C.) was obtained.

Example 3

Production of a Polymer Polyol—3

Into a four-neck flask of 1-liter volume equipped with a Dimroth condenser, 10 parts of SAN and 490 parts of G50 were put. After substituting nitrogen for the air in the flask, while stirring the mixture in the nitrogen atmosphere (until the polymerization was completed), the temperature of the mixture was increased to 130° C. Then, a material previously prepared by mixing 50 parts of the unsaturated polyester (b1(iii)), 200 parts of AN and 200 parts of St, and a material previously prepared by mixing 50 parts of G50 and 1 part of AVN were dropped continuously over 1 hour, each using a dropping pump, at the same time. The reaction mixture was polymerized at 130° C. for 2 hours, and a polymer polyol (F-3) having a content of polymer particles of 45%, a hydroxyl value of 31 mgKOH/g and a viscosity of 4000 mPa·s (25° C.) was obtained.

Example 4

Production of Polymer Polyol—4

Into a four-neck flask of 1-liter volume equipped with a Dimroth condenser, 10 parts of SAN and 340 parts of G50 were put. After substituting nitrogen for the air in the flask, while stirring the mixture in the nitrogen atmosphere (until the polymerization was completed), the temperature of the mixture was increased to 130° C. Then, a material previously prepared by mixing 400 parts of the unsaturated polyester (b1(iv)), 100 parts of AN and 100 parts of St, and a material previously prepared by mixing 50 parts of G50 and 1 part of AVN were dropped continuously over 1 hour, each using a dropping pump, at the same time. The reaction mixture was polymerized at 130° C. for 2 hours, and a polymer polyol (F-4) having a content of polymer particles of 60%, a hydroxyl value of 22 mgKOH/g and a viscosity of 6200 mPa·s (25° C.) was obtained.

Example 5

Production of a Polymer Polyol—5

Into a four-neck flask of 1-liter volume equipped with a Dimroth condenser, 10 parts of SAN and 440 parts of G50 were put. After substituting nitrogen for the air in the flask, while stirring the mixture in the nitrogen atmosphere (until the polymerization was completed), the temperature of the mixture was increased to 130° C. Then, a material previously prepared by mixing 250 parts of the unsaturated polyester (b1(iv)), 150 parts of AN and 100 parts of St, and a material previously prepared by mixing 50 parts of G50 and 1 part of AVN were dropped continuously over 1 hour, each using a dropping pump, at the same time. The mixture was polymerized at 130° C. for 2 hours, and a polymer polyol (F-5) having a content of polymer particles of 50%, a hydroxyl value of 28 mgKOH/g, and a viscosity of 4700 mPa·s (25° C.) was obtained.

Example 6

Production of a Polymer Polyol—6

Into a four-neck flask of 1-liter volume equipped with a Dimroth condenser, 10 parts of SAN and 440 parts of G50 were put. After substituting nitrogen for the air in the flask, while stirring the mixture in the nitrogen atmosphere (until the polymerization was completed), the temperature of the mixture was increased to 130° C. Then, a material previously prepared by mixing 250 parts of the unsaturated polyester (b1(v)), 150 parts of AN and 100 parts of St, and a material previously prepared by mixing 50 parts of G50 and 1 part of AVN were dropped continuously over 1 hour, each using a dropping pump, at the same time. The mixture was polymerized at 130° C. for 2 hours, and a polymer polyol (F-6) having a content of polymer particles of 50%, a hydroxyl value of 28 mgKOH/g and a viscosity of 4900 mPa·s (25° C.) was obtained.

Example 7

Production of a Polymer Polyol—7

Into a four-neck flask of 1-liter volume equipped with a Dimroth condenser, 500 parts of the unsaturated polyester (b1(vi)) was put. After substituting nitrogen for the air in the flask, while stirring the mixture in the nitrogen atmosphere (until the polymerization was completed), the temperature of the mixture was increased to 130° C. Then, a material previously prepared by mixing 50 parts of SAN and 400 parts of G50 was put, and stirred at 130° C. for 3 hours. Then, a material previously prepared by mixing 50 parts of G50 and 1 part of AVN was dropped continuously over 1 hour using a dropping pump. The mixture was polymerized at 130° C. for 2 hours, and a polymer polyol (F-7) having a content of polymer particles of 50%, a hydroxyl value of 28 mgKOH/g and a viscosity of 5500 mPa·s (25° C.) was obtained.

Example 8

Production of a Polymer Polyol—8

Using the same apparatus and method as in Example 7, and using the unsaturated polyester (b1(vii)) in place of the unsaturated polyester (b1(vi)), a polymer polyol (F-8) having a content of polymer particles of 50%, a hydroxyl value of 28 mgKOH/g and a viscosity 5640 mPa·s (25° C.) was obtained.

Example 9

Production of a Polymer Polyol—9

Into a four-neck flask of 2-liter volume equipped with a thermoregulator, a vacuum mixing blade, a dropping pump, a pressure reducing device, a Dimroth condenser, and an inlet and an outlet for nitrogen, 50 parts of G50 was put, and heated at 125° C. while stirring. Then, a material previously prepared by mixing 450 parts of St, 300 parts of AN, 20 parts of GMAP, 680 parts of G50 and 4 parts of AVN was dropped continuously over 4 hours using a dropping pump, and polymerization was carried out. Furthermore, unreacted monomers were removed by stripping under reduced pressure.

Thus, a comparative polymer polyol (F-9) having a content of polymer particles of 50%, a hydroxyl value of 28, and a viscosity of 20,000 mPa·s (25° C.) was obtained.

To 800 parts of the polymer polyol (F-9), 2000 parts of methanol was added. The mixture was subjected to a centrifugal separation at 8000 rpm×60 minutes three times. The separated polymer was washed with methanol, and dried under reduced pressure at 30 to 40° C., so that 350 parts of a polymer was obtained. Further, the polymer was crushed with a mortar, and 350 parts of G50 and 1400 parts of methanol were added to form a dispersion. The dispersion was further subjected twice to a mechanical dispersing process by a homogenizer (type: 15M-8TA) manufactured by A. P. V. GAURIN, Ltd, which has a homovalve within the device and can change the pressure applied to a liquid with a plunger pump. The dispersing process was carried out under the conditions of a dispersing pressure of 700 Kgf/cm$^2$, a processing rate of 60 kg/hr, and a processing temperature of 25° C.

After the dispersing process, methanol was removed by stripping under reduced pressure to obtain a polymer polyol (F-10). The polymer polyol (F-10) produced by the method of the present invention had a viscosity of 5000 mPa·s (25° C.).

Example 10

Production of a Polymer Polyol—10

The polymer polyol (F-9) obtained in Example 9 was subjected twice to a dispersing process by a homogenizer (type: 15M-8TA) manufactured by A. P. V. GAURIN, Ltd., which has a homovalve within the device and can change the pressure applied to a liquid with a plunger pump. The dispersing process was carried out under the conditions of a dispersing pressure of 700 Kgf/cm$^2$, a processing rate of 60 kg/hr, and a processing temperature of 25° C. for 2 minutes. After the dispersing process, a polymer polyol (F-11) having a viscosity of 9760 mPa·s (25° C.) was obtained.

Comparative Example 1

Comparative Example of the Production of a Polymer Polyol—1

The comparative polymer polyol (F-9) obtained in Example 9, but not subjected to the mechanical dispersing process, was used.

Comparative Example 2

Comparative Example of the Production of a Polymer Polyol—2

Using the same apparatus and method used in the production of (F-9) in Example 9, and using 150 parts of G50, 280 parts of St, 120 parts of AN, 8 parts of GMAP, 442 parts of G50 and 1.6 parts of AVN, a comparative polymer polyol (F-12) having a content of polymer particles of 40%, a hydroxyl value of 33 mgKOH/g and a viscosity of 5540 mPa·s (25° C.) was obtained.

Comparative Example 3

Comparative Example of the Production of a Polymer Polyol—3

Using the same apparatus and method used in the production of (F-9) in Example 9, and using 175 parts of G50, 210 parts of St, 90 parts of AN, 6 parts of GMAP, 519 parts of G50 and 1.2 parts of AVN, a comparative polymer polyol (F-13) having a content of polymer particles of 30%, a hydroxyl value of 39 mgKOH/g, and a viscosity of 2000 mPa·s (25° C.) was obtained.

Examples (1) to (11) and Comparative Examples 1 to 3

Production of Polyurethane Foams

Using the polymer polyols (F-1 to F-8, F-10 and 11) of the present invention and the comparative polymer polyols (F-9, F-12 and 13) obtained in Examples 1 to 10 and Comparative Examples 1 to 3, polyurethane foams were produced by the foaming process below, at the mixing ratios of polyurethane foams shown in Tables 1 and 2. The evaluation results for the properties of these foams are shown in Tables 1 and 2.

Preparation Example 11

Production of a Reactive Dispersant (D1)—1

Into a four-neck flask of 500-milliliter volume equipped with a thermoregulator, a mixing blade, and a dropping funnel, 28 parts (0.16 mole) of TDI and 0.01 part of TBT was added, and cooled at 30° C., and subsequently 9 parts (0.07 mole) of HEMA were dropped over 2 hours, while the reaction temperature was maintained at 40 to 50° C. Then, the reaction liquid was put into 963 parts (0.14 mole) of a polyol (a-1) in a four-neck flask of 1 liter volume equipped with a thermoregulator, a mixing blade, and a dropping funnel, and stirred for 4 hours at a reaction temperature of 80 to 90° C. It was confirmed by infrared absorption spectrum that no unreacted isocyanate group was present, and a reactive dispersant (D1-1) was obtained.

(D1-1) had a hydroxyl value of 20 and a viscosity of 20000 mPa·s/25° C., and a ratio of the number of unsaturated groups to the number of nitrogen-containing bonds was 0.22.

Preparation Example 12

Production of a Reactive Dispersant (D1)—2

A reactive dispersant (D1-2) was obtained in the same manner as that of Preparation Example 1 except that 8 parts (0.07 mole) of HEA was used in place of 9 parts of HEMA, and that 964 parts (0.14 mole) of the polyol (a-1) was used in place of 963 parts of the same.

(D1-2) had a hydroxyl value of 20 and a viscosity of 19500 mPa·s/25° C., and a ratio of the number of unsaturated groups to the number of nitrogen-containing bonds was 0.22.

Preparation Example 13

Production of a Reactive Dispersant (D1)—3

A reactive dispersant (D1-3) was obtained in the same manner as that of Preparation Example 11 except that 1120 parts (0.16 mole) of the polyol (a-1) was used in place of 963 parts of the same, and that a four-neck flask of 2-liter volume was used.

(D1-3) had a hydroxyl value of 19 and a viscosity of 25000 mPa·s/25° C., and a ratio of the number of unsaturated groups to the number of nitrogen-containing bonds was 0.22.

Example 21

Production of a Polymer Polyol Composition—21

Into a four-neck flask equipped with a thermoregulator, a vacuum mixing blade, a dropping pump, a pressure reducing device, a Dimroth condenser, and an inlet and an outlet for nitrogen, 10 parts of SAN and 440 parts of G50 were added, and after substituting nitrogen for the air in the flask, heated at 130° C. in the nitrogen atmosphere while stirring (until the polymerization was completed). Then, a material previously prepared by mixing 250 parts of a 2.2-mole propylene oxide adduct of allyl alcohol (Mn=186, SP=10.2), 150 parts of AN, and 100 parts of St, and a material previously prepared by mixing 50 parts of G50 and 1 part of AVN were dropped continuously over 1 hour using dropping pumps simultaneously, and polymerization was carried out for 2 hours at 130° C. Furthermore, unreacted monomers were removed by stripping under reduced pressure. Thus, a polymer polyol composition (F-21) having a content of polymer particles of 50% and a viscosity of 4000 mPa·s (25° C.) was obtained.

Example 22

Production of a Polymer Polyol Composition—22

Into a four-neck flask identical to that used in Example 21, 10 parts of SAN and 440 parts of G50 were added, and after substituting nitrogen for the air in the flask, heated at 130° C. in the nitrogen atmosphere while stirring (until the polymerization was completed). Then, a material previously prepared by mixing 200 parts of a compound having an acetoacetyl group expressed by a formula [6] shown below (Mn=215, SP=11.5), 150 parts of AN, and 150 parts of St, and a material previously prepared by mixing 50 parts of G50 and 1 part of AVN were dropped continuously over 1 hour using dropping pumps simultaneously, and polymerization was carried out for 2 hours at 130° C. Furthermore, unreacted monomers were removed by stripping under reduced pressure. Thus, a polymer polyol composition (F-22) having a content of polymer particles of 50% and a viscosity of 4000 mPa·s (25° C.) was obtained.

$$CH_2=C(CH_3)COOCH_2CH_2OCOCH_2COCH_3 \qquad [6]$$

Example 23

Production of a Polymer Polyol Composition—23

Into a four-neck flask identical to that used in Example 21, 10 parts of SAN and 440 parts of G50 were added, and after substituting nitrogen for the air in the flask, heated at 130° C. in the nitrogen atmosphere while stirring (until the polymerization was completed). Then, a material previously prepared by mixing 50 parts of a compound having a ring-opening lactone chain expressed by a formula [7] shown below (Mn=300, SP=10.4), 200 parts of AN, and 250 parts of St, and a material previously prepared by mixing 50 parts of G50 and 1 part of AVN were dropped continuously over 1 hour using dropping pumps simultaneously, and polymerization was carried out for 2 hours at 130° C. Furthermore, unreacted monomers were removed by stripping under reduced pressure. Thus, a polymer polyol composition (F-23) having a content of polymer particles of 50% and a viscosity of 4200 mPa·s (25° C.) was obtained.

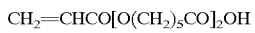  [7]

Example 24

Production of a Polymer Polyol Composition—24

Into a four-neck flask identical to that used in Example 21, 10 parts of SAN and 440 parts of G50 were added, and after substituting nitrogen for the air in the flask, heated at 130° C. in the nitrogen atmosphere while stirring (until the polymerization was completed). Then, a material previously prepared by mixing 180 parts of a compound having a succinic acid residue expressed by a formula [8] shown below (Mn=230, SP=11.2), 160 parts of AN, and 160 parts of St, and a material previously prepared by mixing 50 parts of G50 and 1 part of AVN were dropped continuously over 1 hour using dropping pumps simultaneously, and polymerization was carried out for 2 hours at 130° C. Furthermore, unreacted monomers were removed by stripping under reduced pressure. Thus, a polymer polyol composition (F-24) having a content of polymer particles of 50% and a viscosity of 4900 mPa·s (25° C.) was obtained.

$$CH_2=C(CH_3)COOCH_2CH_2OCOCH_2CH_2COOH \quad [8]$$

Example 25

Production of a Polymer Polyol Composition—25

Into a four-neck flask identical to that used in Example 21, 10 parts of SAN and 440 parts of G50 were added, and after substituting nitrogen for the air in the flask, heated at 130° C. in the nitrogen atmosphere while stirring (until the polymerization was completed). Then, a material previously prepared by mixing 250 parts of a compound having a phthalic acid residue expressed by a formula [9] shown below (Mn=336, SP=12.0), 150 parts of AN, and 100 parts of St, and a material previously prepared by mixing 50 parts of G50 and 1 part of AVN were dropped continuously over 1 hour using dropping pumps simultaneously, and polymerization was carried out for 2 hours at 130° C. Furthermore, unreacted monomers were removed by stripping under reduced pressure. Thus, a polymer polyol composition (F-25) having a content of polymer particles of 50% and a viscosity of 5300 mPa·s (25° C.) was obtained.

  [9]

where (Ph) represents an orthophenylene group.

Example 26

Production of a Polymer Polyol Composition—26

A polymer polyol composition (F-26) having a content of polymer particles of 50% and a viscosity of 3800 mPa·s (25° C.) was obtained in the same manner as that of Example 21 except that 10 parts of the reactive dispersant (D1-1) was used in place of 10 parts of SAN as a dispersant.

Example 27

Production of a Polymer Polyol Composition—27

A polymer polyol composition (F-27) having a content of polymer particles of 50% and a viscosity of 3900 mPa·s (25° C.) was obtained in the same manner as that of Example 21 except that 10 parts of the reactive dispersant (D1-2) was used in place of 10 parts of SAN as a dispersant.

Example 28

Production of a Polymer Polyol Composition—28

Into a four-neck flask identical to that used in Example 21, 10 parts of the reactive dispersant (D1-1), 440 parts of G50, and 80 parts of xylene were added, and after substituting nitrogen for the air in the flask, heated at 130° C. in the nitrogen atmosphere while stirring (until the polymerization was completed). Then, a material previously prepared by mixing 250 parts of a 2.2-mole propylene oxide adduct of allyl alcohol (Mn=186, SP=10.2), 150 parts of AN, and 100 parts of St, and a material previously prepared by mixing 50 parts of G50 and 1 part of AVN were dropped continuously over 1 hour using dropping pumps simultaneously, and polymerization was carried out for 2 hours at 130° C. After adding 20 parts of water to the reaction product, xylene and unreacted monomers were removed from the reaction product by stripping under reduced pressure of 10 mmHg at 130° C. for 3 hours. Thus, a polymer polyol composition (F-28) having a content of polymer particles of 50% and a viscosity of 3100 mPa·s (25° C.) was obtained.

Example 29

Production of a Polymer Polyol Composition—29

A polymer polyol composition (F-29) having a content of polymer particles of 50% and a viscosity of 4000 mPa·s (25° C.) was obtained in the same manner as that of Example 21 except that 10 parts of the reactive dispersant (D1-3) was used in place of 10 parts of SAN as a dispersant.

Examples 21 to 29

Production of Polyurethane Foams

Using the polymer polyol compositions (F-21 to F-29) of the present invention obtained in Examples 21 to 29, polyurethane foams were produced by the foaming process in Table 3. The evaluation results for the properties of these foams are shown in Table 3.

[Foaming Process]

(1) The temperatures of the polymer polyol and the organic polyisocyanate were adjusted each to 25±2° C.

(2) A polymer polyol, a foam stabilizer, water and a catalyst were put into a stainless beaker of 1-liter volume in this order, and stirred and mixed at room temperature (25±2° C.). Immediately, an organic polyisocyanate was added. Using an agitator (Homodisper; manufactured by TOKUSHU KIKA INDUSTRIES, Ltd.; stirring condition, 2000 rpm×6 seconds), the mixture was stirred, and foaming was carried out.

(3) After stopping stirring, the content was put into a wooden box of 25×25×10 cm, and a polyurethane foam was obtained.

TABLE 1

|  | Example | | | | | | | |
|---|---|---|---|---|---|---|---|---|
|  | (1) | (2) | (3) | (4) | (5) | (6) | (7) | (8) |
| Polymer Polyol | F-1 | F-2 | F-3 | F-4 | F-5 | F-6 | F-7 | F-8 |
| Concentration of polymer particles [mass %] | 50 | 55 | 45 | 60 | 50 | 50 | 50 | 50 |
| Hydroxyl value [mgKOH/g] | 28 | 25 | 31 | 22 | 28 | 28 | 28 | 28 |
| Viscosity (25° C.) [mPa · s] | 4500 | 4800 | 4000 | 6200 | 4700 | 4900 | 5500 | 5640 |
| Upper limit of viscosity in the inequality (1) (25° C.) [mPa · s] | 7800 | 13100 | 4900 | 23300 | 7800 | 7800 | 7800 | 7800 |
| Polyol-soluble polymer [mass %] | 2 | 1 | 1 | 2 | 2 | 2 | 5 | 5 |
| Dispersion stability | ○ | ○ | ○ | ○ | ○ | ○ | ○ | ○ |
| Polyurethane Foam [mixing ratio (parts)] | | | | | | | | |
| Polymer polyol | 100 | 100 | 100 | 100 | 100 | 100 | 100 | 100 |
| Water | 2.7 | 2.7 | 2.7 | 2.7 | 2.7 | 2.7 | 2.7 | 2.7 |
| Catalyst A | 0.18 | 0.18 | 0.18 | 0.18 | 0.18 | 0.18 | 0.18 | 0.18 |
| Catalyst B | 0.10 | 0.10 | 0.10 | 0.10 | 0.10 | 0.10 | 0.10 | 0.10 |
| Catalyst C | 0 | 0 | 0 | 0 | 0 | 0 | 0 | 0 |
| F-242T | 1.0 | 1.0 | 1.0 | 1.0 | 1.0 | 1.0 | 1.0 | 1.0 |
| TDI-80 | 31.1 | 30.6 | 31.6 | 30.1 | 31.1 | 32.0 | 32.0 | 32.0 |
| Foam Properties | | | | | | | | |
| Density [kg/ml] | 33.5 | 33.8 | 33.3 | 33.8 | 33.9 | 33.4 | 33.6 | 33.9 |
| 25% ILD [kgf/314 cm$^2$] | 41.8 | 42.7 | 41.6 | 44.3 | 41.4 | 43.3 | 41.5 | 41.0 |
| Tensile strength [kgf/cm$^2$] | 1.49 | 1.40 | 1.48 | 1.35 | 1.46 | 1.46 | 1.48 | 1.49 |
| Tear strength [kgf/cm] | 0.84 | 0.81 | 0.85 | 0.92 | 0.81 | 0.82 | 0.83 | 0.78 |
| Elongation [%] | 71 | 69 | 70 | 66 | 68 | 70 | 70 | 68 |
| Resilience [%] | 31 | 30 | 31 | 27 | 30 | 28 | 26 | 25 |
| Air Flow [ft$^3$/min] | 2.9 | 3.2 | 2.8 | 2.2 | 3.1 | 2.8 | 2.9 | 3.2 |
| Compression set [%] | 31.4 | 33.0 | 31.3 | 36.0 | 33.0 | 32.5 | 31.4 | 33.0 |

TABLE 2

|  | Example | | | Comparative Example | | |
|---|---|---|---|---|---|---|
|  | (9) | (10) | (11) | (1) | (2) | (3) |
| Polymer Polyol | F-10 | F-11 | F-6 | F-9 | F-12 | F-13 |
| Concentration of polymer particles [mass %] | 50 | 50 | 50 | 50 | 40 | 30 |
| Hydroxyl value [mgKOH/g] | 28 | 28 | 28 | 28 | 33 | 39 |
| Viscosity (25° C.) [mPa · s] | 5000 | 9760 | 4900 | 20000 | 5540 | 2000 |
| Upper limit of viscosity in the inequality (1) (25° C.) [mPa · s] | 7800 | 7800 | 7800 | 7800 | 3200 | 1580 |
| Polyol-soluble polymer [mass %] | 0 | 6 | 2 | 10 | 8 | 6 |
| Dispersion stability | ○ | ○ | ○ | Δ | Δ | Δ |
| Polyurethane Foam [mixing ratio (parts)] | | | | | | |
| Polymer polyol | 100 | 100 | 100 | 100 | 100 | 100 |
| Water | 2.7 | 2.7 | 2.7 | 2.7 | 2.7 | 2.7 |
| Catalyst A | 0.18 | 0.18 | 0.18 | 0.18 | 0.18 | 0.18 |
| Catalyst B | 0.10 | 0.10 | 0 | 0.10 | 0.10 | 0.10 |
| Catalyst C | 0 | 0 | 0.30 | 0 | 0 | 0 |
| F-242T | 1.0 | 1.0 | 1.0 | 1.0 | 1.0 | 1.0 |
| TDI-80 | 32.0 | 32.0 | 32.0 | 32.0 | 33.0 | 33.9 |
| Foam Properties | | | | | | |
| Density [kg/m$^3$] | 33.7 | 33.8 | 32.4 | 33.4 | 33.2 | 33.8 |
| 25% ILD [kgf/314 cm$^2$] | 45.7 | 41.7 | 44.5 | 40.3 | 35.7 | 32.4 |
| Tensile strength [kgf/cm$^2$] | 1.52 | 1.48 | 1.52 | 1.46 | 1.57 | 1.66 |
| Tear strength [kgf/cm] | 0.89 | 0.83 | 0.86 | 0.75 | 0.76 | 0.71 |
| Elongation [%] | 70 | 70 | 74 | 65 | 90 | 105 |
| Resilience [%] | 30 | 30 | 32 | 24 | 27 | 28 |
| Air Flow [ft$^3$/min] | 3.9 | 2.9 | 2.2 | 1.3 | 3.0 | 3.7 |
| Compression set [%] | 28.4 | 31.4 | 27.5 | 37.5 | 28.2 | 10.5 |

TABLE 3

| | Example | | | | | | | | |
|---|---|---|---|---|---|---|---|---|---|
| | 21 | 22 | 23 | 24 | 25 | 26 | 27 | 28 | 29 |
| Polymer Polyol | F-21 | F-22 | F-23 | F-24 | F-25 | F-26 | F-27 | F-28 | F-29 |
| Concentration of polymer particles [mass %] | 50 | 50 | 50 | 50 | 50 | 50 | 50 | 50 | 50 |
| Viscosity (25° C.) [mPa · s] | 4000 | 4000 | 4200 | 4900 | 5300 | 3800 | 3900 | 3100 | 4000 |
| Upper limit of viscosity in the inequality (1) (25° C.) [mPa · s] | 7800 | 7800 | 7800 | 7800 | 7800 | 7800 | 7800 | 7800 | 7800 |
| Polyol-soluble polymer [mass %] | 1 | 1 | 2 | 2 | 3 | 1 | 1 | 1 | 1 |
| Dispersion stability (1) | ○ | ○ | ○ | ○ | ○ | ○ | ○ | ○ | ○ |
| Dispersion stability (2) | ○ | ○ | ○ | ○ | ○ | ◎ | ◎ | ◎ | ◎ |
| Polyurethane Foam [mixing ratio (parts)] | | | | | | | | | |
| Polymer polyol | 100 | 100 | 100 | 100 | 100 | 100 | 100 | 100 | 100 |
| Water | 2.7 | 2.7 | 2.7 | 2.7 | 2.7 | 2.7 | 2.7 | 2.7 | 2.7 |
| Catalyst A | 0.18 | 0.18 | 0.18 | 0.18 | 0.18 | 0.18 | 0.18 | 0.18 | 0.18 |
| Catalyst B | 0.10 | 0.10 | 0.10 | 0.10 | 0.10 | 0.10 | 0.10 | 0.10 | 0.10 |
| F-242T | 1.0 | 1.0 | 1.0 | 1.0 | 1.0 | 1.0 | 1.0 | 1.0 | 1.0 |
| TDI-80 | 30.7 | 31.4 | 30.9 | 31.2 | 31.7 | 30.7 | 30.7 | 30.7 | 30.7 |
| Foam Properties | | | | | | | | | |
| Density [kg/m$^3$] | 33.0 | 33.1 | 33.3 | 33.4 | 33.0 | 33.2 | 33.1 | 33.2 | 33.0 |
| 25% ILD [kgf/314 cm$^2$] | 43.4 | 43.2 | 42.7 | 43.6 | 43.1 | 44.5 | 44.8 | 45.1 | 45.1 |
| Tensile strength [kgf/cm$^2$] | 1.50 | 1.48 | 1.49 | 1.45 | 1.36 | 1.50 | 1.48 | 1.49 | 1.53 |
| Tear strength [kgf/cm] | 0.19 | 0.83 | 0.87 | 0.89 | 0.85 | 0.88 | 0.92 | 0.91 | 0.96 |
| Elongation [%] | 71 | 70 | 71 | 69 | 70 | 70 | 72 | 70 | 75 |
| Resilience [%] | 30 | 32 | 29 | 28 | 31 | 29 | 31 | 30 | 31 |
| Air Flow [ft$^3$/min] | 3.0 | 3.1 | 2.9 | 3.0 | 2.7 | 2.8 | 2.6 | 2.9 | 2.7 |
| Compression set [%] | 30.9 | 32.0 | 32.7 | 34.8 | 32.7 | 30.1 | 29.5 | 29.4 | 25.3 |

The foam properties in Tables 1 to 3 are evaluated by the methods as follows.
Density (kg/m$^3$): according to JIS K6400-1997 [item 5]
25% ILD (kgf/314 Cm$^2$): according to JIS K6382-1995 [item 5.3]
Tensile Strength (kgf/cm$^2$): according to JIS K6301-1995 [item 3]
Tear Strength (kgf/cm): according to JIS K6301-1995 [item 9]
Elongation (%): according to JIS K6301-1995 [item 3]
Resilience (%): according to JIS K6400-1997 [item 7]
Air Flow (ft$^3$/min): using Dow type flowmeter [manufactured by AMSCOR, Ltd.] (test piece 5 cm×5 cm×2.5 cm)
Compression Set (%): according to JIS K6382-1995 [item 5.5]

Usually, as the properties of polyurethane foams, a density in the range of 15 to 50 kg/m$^3$ is preferable, and larger values of 25% ILD, tensile strength, tear strength, elongation, resilience and air flow are preferable. Furthermore, a smaller value of compression set is preferable.

As seen from Tables 1 to 3, the polymer polyols (F-1 to F-8, F-10, F-11, and F-21 to F29) of Examples 1 to 10 and 21 to 29 have lower viscosities than the polymer polyol (F-9) of Comparative Example 1, and have more excellent properties, particularly in 25% ILD (hardness), air flow and compression set. Moreover, the polyurethane foams produced from the polymer polyols (F-1 to F-8, F-10 and 11) have the same or higher tensile strength, tear strength, elongation, and resilience as those produced from the polymer polyol (F-9). Furthermore, because the polymer polyols (F-12, F-13) of Comparative Examples 2 and 3 have lower concentrations of polymer particles than the polymer polyols (F-1 to F-8, F-10, F-11, and F-21 to F-29) of Examples 1 to 10 and 21 to 29 and the comparative polymer polyol (F-9) of Comparative Example 1, they have low viscosities. However, the properties of the polyurethane foams produced from the polymer polyols (F-12, F-13) are significantly inferior to the properties of the polyurethane foams produced from the polymer polyols (F-1 to F-8, F-10 and 11), particularly in 25% ILD (hardness). In general, as the concentration of polymer particles increases, the tensile strength, elongation, resilience and air flow decrease, and the compression set increases. However, the polyurethane foams using the polymer polyols of the present invention [Examples (1), (5) to (10), and (21) to (29)] exhibit the same or greater properties than the polyurethane foam of Comparative Example 1 having the same concentration of polymer particles.

Industrial Applicability

According to the polymer polyols of the present invention and the methods for producing the same, polymer polyols having low viscosities and exceptionally good dispersion stability can be obtained, even when the polymer polyols have a higher concentration of polymer particles than conventional polymer polyols. Thus, the operation efficiency can be improved significantly in the production of polyurethane resins, etc.

Furthermore, the polyurethane resins produced using the polymer polyols of the present invention as an essential component of a polyol exhibit much more excellent 25% ILD (hardness) than those produced using conventional polymer polyols, when they have the same viscosity. Furthermore, the polyurethane resins produced using the polymer polyols of the present invention have considerably better 25% ILD, air flow and compression set than those produced using conventional polymer polyols, when the concentrations of polymer particles the polymer polyols are the same.

Because of the above-mentioned effects, the polyurethane resins produced using the polymer polyols of the present invention are exceptionally suitable as polyurethane foams for the uses such as interior parts of automobiles, furniture, and the like.

What is claimed is:

1. A polymer polyol composition (I) comprising a dispersion medium composed of a polyol (A) or (A) and a diluent (C), and polymer particles (B) dispersed in the dispersion medium, wherein the polymer particles (B) are formed by polymerizing an ethylenically unsaturated compound (b) in a polyol or in a polyol and the diluent (C); a content of (B) in (I) is from 45 to 75 mass %, based on the mass of (I); an amount of soluble polymers (P) dissolved in (A) is not more than 5 mass %, based on the amount of (A), and at least 5 mass % of (b) comprises a terminal ethylenically-unsaturated group containing compound (b3) having a number average molecular weight of 160 to 490 and a solubility parameter SPb of 9.5 to 13.

* * * * *